(12) United States Patent
Yamada et al.

(10) Patent No.: US 7,810,129 B2
(45) Date of Patent: Oct. 5, 2010

(54) VIDEO DISPLAY APPARATUS AND REPRODUCTION APPARATUS

(75) Inventors: Masazumi Yamada, Osaka (JP); Yukio Matsuura, Osaka (JP); Takuo Otsuki, Osaka (JP); Takahiro Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 11/885,211

(22) PCT Filed: Sep. 25, 2006

(86) PCT No.: PCT/JP2006/318955

§ 371 (c)(1),
(2), (4) Date: Aug. 28, 2007

(87) PCT Pub. No.: WO2007/040080

PCT Pub. Date: Apr. 12, 2007

(65) Prior Publication Data

US 2008/0168504 A1   Jul. 10, 2008

(30) Foreign Application Priority Data

Sep. 30, 2005   (JP) .............................. 2005-289094

(51) Int. Cl.
*H04N 7/173* (2006.01)
*H04N 7/16* (2006.01)
(52) U.S. Cl. .................. 725/133; 725/141; 725/152
(58) Field of Classification Search .................. 725/133, 725/141, 152
See application file for complete search history.

(56) References Cited

U.S. PATENT DOCUMENTS 6,219,839 B1 * 4/2001 Sampsell ..................... 725/40
6,557,170 B1 * 4/2003 Wilder et al. ............... 725/130

FOREIGN PATENT DOCUMENTS

JP    6-205237    7/1994
JP    2000-350131    12/2000

OTHER PUBLICATIONS

Hiigh-Definition Multimedia Interface, Specification Version 1.1, HDMI Licensing, May 20, 2004 [online]. [retrieval date Dec. 19, 2006], Internet<URL:http://www.hdmi.org/download/HDMI_Specification_1.1.pdf>, pp. CEC-28 to CEC 36).
IEEE 1394 Trade Association TA Document 2001001 AV/C Panel Subunit Specification 1.1, May 8, 2001.

* cited by examiner

*Primary Examiner*—Hunter B. Lonsberry
(74) *Attorney, Agent, or Firm*—Wenderoth, Lind & Ponack, L.L.P.

(57) ABSTRACT

The present invention has an object to operate a reproduction apparatus (an apparatus from which video is inputted) using only a remote control of a video display apparatus. A video display apparatus which displays video includes: a first display unit which displays a menu screen of the video display apparatus; a switching unit which switches a current input to an input from an input source device from which video is inputted when the input source device is indicated in the menu screen displayed by the first display unit; and a second display unit which displays a menu screen of the input source device when the switching unit switches the current input.

14 Claims, 15 Drawing Sheets

VIDEO DISPLAY APPARATUS AND REPRODUCTION APPARATUS

TECHNICAL FIELD

The present invention relates to an AV system which includes a reproduction apparatus or a recording and reproduction apparatus (hereinafter referred to as a reproduction apparatus) and a video display apparatus such as a television (hereinafter referred to as a TV) or the like, and particularly to technology which allows operations of the reproduction apparatus using only a remote control of the TV.

BACKGROUND ART

Nowadays, the usage of TVs is not limited to the reception and viewing of TV broadcasts, and they are used for a variety of purposes. For example, by connecting a digital video recorder (DVR) such as a video tape recorder (VTR) and a DVD recorder to a TV, it is possible to view contents reproduced by these external devices. For this reason, many TVs are equipped with one or more external input terminals in addition to an antenna terminal to receive TV broadcasts. A user can switch between these input terminals by operating buttons on a remote control and the TV body.

TVs equipped with a number of external input terminals (many of which are high-end TVs) have the advantage of being able to connect to a number of external devices, such as a DVR and a home-use game machine, at the same time. On the other hand, there is a drawback in that operations become complicated since it is necessary to manually switch inputs. It is also inconvenient to have to change remote controls for each external device and operate it after switching the input.

In view of this, there has been suggested or standardized a technique for automatically switching the input of the TV to another device by transmitting commands between the TV and an external device such as a VTR and a technique for transferring the key entries of the remote control using these commands.

For example, a reproduction apparatus disclosed in Patent Document 1 identified below sends an instruction signal such as an infrared signal to a TV when starting reproduction. This instruction signal is a signal instructing that the input of the TV should be switched to the input terminal of the TV to which the output terminal of the reproduction apparatus is connected. Furthermore, when entering a power-off state, this reproduction apparatus sends, to the TV, a signal to instruct that the input of the TV should be switched to the antenna or tuner. By doing so, it is possible to send, from the remote control for the reproduction apparatus to the reproduction apparatus, an instruction to display a menu screen, and at the same time, to send, from the remote control for the reproduction apparatus directly to the TV, an infrared signal indicating the key code of the remote control. Consequently, it becomes possible to switch the input of the TV to the input terminal thereof to which the reproduction apparatus is connected and thus display the menu screen of the reproduction apparatus on the TV screen.

Note that the AV.link standard (Non-patent Document 1 identified below) specifies commands to allow the interoperability between a TV, a VTR, and the like. According to this standard, the VTR issues a predetermined command to the TV, when the VTR starts reproduction or when the VTR displays a menu screen. By doing so, it is possible to send, from the remote control for the reproduction apparatus to the reproduction apparatus, an instruction to display a menu screen, and at the same time, to send, from the reproduction apparatus to the TV via the AV.link line, a predetermined command to request a screen switch. Consequently, it becomes possible to switch the input of the TV to the input terminal thereof to which the reproduction apparatus is connected and thus display the menu screen of the reproduction apparatus on the TV screen.

After the menu screen is displayed, it is possible to operate the reproduction apparatus by sending, from the remote control for the reproduction apparatus to the reproduction apparatus, an infrared signal indicating the key code of the remote control, as in the normal manner. By doing so, it is possible to avoid having to change the remote control for the TV to the remote control for the reproduction apparatus and operate it after switching the input of the TV to another using the remote control for the TV. In the case where the remote control for the reproduction apparatus is equipped with a TV input switch key, there is no need to change to the remote control for the TV. In this case, too, by pressing the TV input switch key several times, it is possible to save the effort of switching the input of the TV to the signal from the input terminal to which the reproduction apparatus is connected. A CEC line in the HDMI interface disclosed in Non-patent Document 2 identified below can also realize the same functions.

Note that Non-patent Document 3 identified below specifies commands to transfer key codes of a remote control between devices which are connected under IEEE 1394 standard. According to this specification, for example, by transferring, using predetermined commands, key codes of the TV remote control such as "up", "down", "left", "right", "enter" and the like to a device which displays a menu screen on a TV screen, it is possible to operate that device with the TV remote control.

Patent Document 1: Japanese Laid-Open Patent Application No. 2000-350131
Non-patent Document 1: CENELEC AV.link (EN50157-1, EN50157-2-1, EN50157-2-2, EN50157-2-3)
Non-patent Document 2: HDMI Specification 1.1 (CEC Supplement)
Non-patent Document 3: IEEE 1394 Trade Association TA Document 2001001 AV/C Panel Subunit Specification 1.1

DISCLOSURE OF INVENTION

Problems that Invention is to Solve

However, according to the technology disclosed in Patent Document 1, Non-patent Document 1, or Non-patent Document 2, it is possible to operate the TV using only a remote control for the reproduction apparatus, whereas it is impossible or very troublesome to operate the reproduction apparatus using only the TV remote control, which is a problem with this technology.

First, since the TV remote control is not usually equipped with the power key for the reproduction apparatus, when the reproduction apparatus is in the standby state, it is not possible even to activate the reproduction apparatus in the standby state using the TV remote control. Even if the TV is equipped with a function for transferring the remote control key codes disclosed in Non-patent Document 3, the power key of the TV needs to work for the TV and therefore it is difficult to transfer the power key codes to the reproduction apparatus. As opposed to the fact that remote controls for the reproduction apparatuses are usually equipped with the power keys for the TV, the TV remote control is rarely equipped with the power keys for the reproduction apparatuses. This is because even if the TV remote control is equipped with the power keys for reproduction apparatuses connected to the TV, it is difficult to identify, among the reproduction apparatuses, which reproduction apparatus the TV remote control works for, and it is also troublesome to set that reproduction apparatus.

Even if the power of the reproduction apparatus is on, it is not possible to instruct the reproduction apparatus to display the menu screen using the TV remote control. Even if the TV is equipped with the function for transferring the remote control key code entries disclosed in Non-patent Document 3, the TV remote control works for displaying the menu screen of the TV if the "menu" key of the TV is pressed, and therefore it is difficult to transfer the "menu" key entry to the reproduction apparatus.

The present invention has been conceived in view of the above problems, and has an object to operate a reproduction apparatus using only a remote control of a TV in an AV system in which the reproduction apparatus and the TV are connected.

Means to Solve the Problems

In order to achieve the above object, a video display apparatus according to the present invention is a video display apparatus which displays video, and includes: a first display unit which displays a menu screen of the video display apparatus; a switching unit which switches a current input to an input from an input source device from which video is inputted when the input source device is indicated in the menu screen displayed by the first display unit; and a second display unit which displays a menu screen of the input source device when the switching unit switches the current input. With this structure, when the input source device is indicated through the menu screen, the input is switched to an input source device from which video is inputted, and thus it becomes possible to operate the input source device (i.e., a reproduction apparatus) using only the remote control of the video display apparatus (i.e., a TV).

Here, the above-mentioned video display apparatus may further include a command input/output unit which outputs, to the input source device, a command to check a power state of the input source device, and when the input source device is not powered on, outputs, to the input source device, a command to request the input source device to turn on. With this structure, it is possible for the video display apparatus to instruct the input source device to turn on.

The above-mentioned video display apparatus may further include a command input/output unit which outputs, to the input source device, a command to instruct the input source device to start video output, and in the apparatus as structured as such, the switching unit switches the current input to the input from the input source device, upon receiving, from the input source device, a command to notify the start of the video output. With this structure, since the input is switched by the command from the input source device, it is possible to properly switch the input even in the case where a switching apparatus or the like is placed between the video display apparatus and the input source device.

The above-mentioned video display apparatus may further include a command input/output unit which outputs, to the input source device, a command to instruct the input source device to start video output upon confirming that the input source device is powered on, and in the apparatus as structured as such, the switching unit switches the current input to the input from the input source device upon receiving, from the input source device, a command to notify the start of the video output. With this structure, since the input is switched by the command from the input source device, it is possible to properly switch the input even in the case where a switching apparatus or the like is placed between the video display apparatus and the input source device.

The above-mentioned video display apparatus may further include a command input/output unit which outputs, to the input source device, a command to request the input source device to display a menu screen of the input source device. With this structure, it is possible for the second display unit of the video display apparatus to display the menu screen of the input source device.

The above-mentioned video display apparatus may further include a user input unit which receives an instruction inputted by a user; and a command input/output unit which converts the instruction received by the user input unit into a predetermined format, and to transfer the converted instruction to the input source device. With this structure, it is possible to operate the input source device according to, for example, the information inputted from the remote control of the video display apparatus.

The above-mentioned video display apparatus may further include a voice guidance creation unit which creates voice guidance data indicating that the switching unit has switched to the input from the input source device; and a voice output unit which outputs the voice guidance data created by the voice guidance creation unit. With this structure, since the voice notification that the input has been switched is given to the user, the user can figure out the situation properly.

The above-mentioned video display apparatus may further include a device information obtainment unit which obtains device information which is information regarding the input source device; and a screen creation unit which creates the menu screen of the video display apparatus using the device information obtained by the device information obtainment unit. With this structure, the menu screen is created using the information regarding the input source device. In other words, it is possible to display a menu screen which depends on a connected device.

Furthermore, a reproduction apparatus according to the present invention is a reproduction apparatus which reproduces video, and includes: a screen creation unit which creates a menu screen of the reproduction apparatus; a voice guidance creation unit which creates voice guidance data indicating that a current input has been switched to an input from the reproduction apparatus or that a current menu screen has been switched to the menu screen of the reproduction apparatus; and a data output unit which outputs the menu screen of the reproduction apparatus to a video display apparatus, and outputs the voice guidance data created by the voice guidance creation unit to the video display apparatus. With this structure, since the voice notification that the input has been switched is given to the user, the user can figure out the situation properly.

Note that the data output unit may output the voice guidance data created by the voice guidance creation unit to the video display apparatus when a predetermined time has passed since outputting the menu screen of the reproduction apparatus to the video display apparatus. With this structure, since the voice notification is not given until the video display apparatus completes the input switching, it is possible to prevent the entire voice notification or the beginning of the voice notification from being omitted.

Or, the data output unit may output the voice guidance data created by the voice guidance creation unit to the video display apparatus, upon receiving, from the video display apparatus, a command indicating that the current input has been switched. With this structure, since the voice notification is not given until the video display apparatus completes the input switching, it is possible to prevent the entire voice notification or the beginning of the voice notification from being omitted.

The above-mentioned reproduction apparatus may include a control unit which mutes audio upon receiving, from the video display apparatus, the command indicating that the current input has been switched. With this structure, since the audio is muted after the input has been switched, it is possible to prevent the voice notification from being poorly heard.

Note that it is not only possible to embody the present invention as the above-described video display apparatus, but also as a video display method which includes, as its respective steps, the characteristic units included in such video display apparatus.

EFFECTS OF THE INVENTION

As is obvious from the above description, according to the video display apparatus of the present invention, the input is switched to an input source device from which video is inputted, when the input source device is indicated through the menu screen. After that, a user can perform an operation even if he/she continues operating the remote control of the video display apparatus, whereas he/she conventionally has to perform the operation after changing the remote control of the video display apparatus to that of the input source device. In other words, according to the present invention, it is possible to operate the input source device using only the remote control of the video display apparatus.

Figure 1:
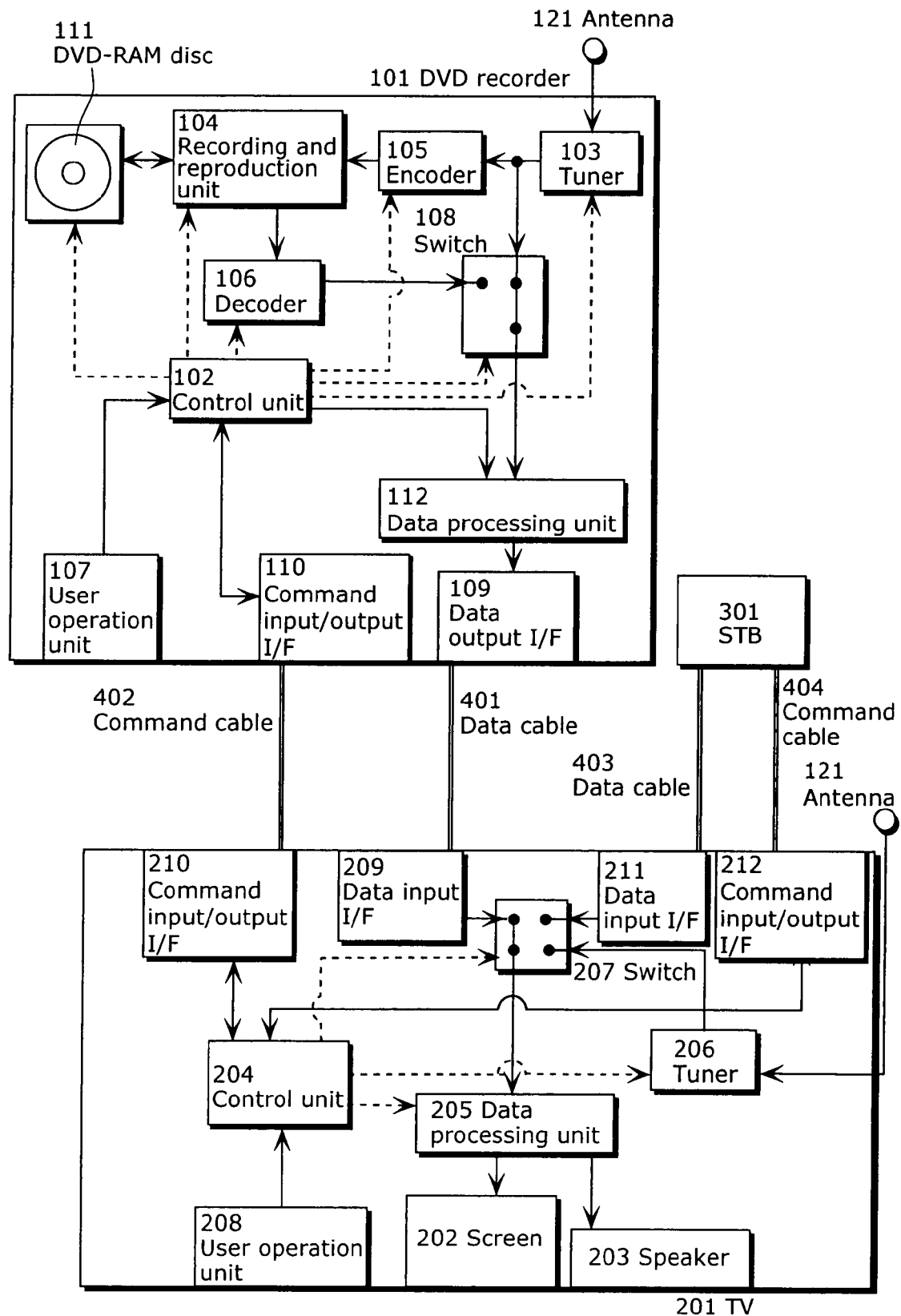
FIG. 1 is a diagram which shows example structures of a TV and a DVD recorder in the first embodiment.

NUMERICAL REFERENCES 101, 501, 601, 801, 1001 DVD recorders
102, 502, 602, 802, 1002 Control units
103 Tuner
104 Recording and reproduction unit
105 Encoder
106 Decoder
107 User operation unit
108 Switch
109 Data output I/F
110 Command input/output I/F
111 DVD-RAM disc
112, 503, 1012 Data processing units
121 Antenna
201, 701, 901, 1101 TVs
202 Screen
203 Speaker
204, 704, 904, 1104 Control units
205, 905 Data processing units
206 Tuner
207 Switch
208 User operation unit
209, 211 Data input I/Fs
210, 212 Command input/output I/Fs
301 STB
401, 403 Data cables
402, 404 Command cables
504 Timer

BEST MODE FOR CARRYING OUT THE INVENTION

Hereafter, embodiments of the present invention will be described in detail with reference to the drawings.

First Embodiment

Hereafter, a first embodiment of the present invention will be described with reference to FIG. 1 through FIG. 4.

FIG. 1 is a diagram which shows example structures of a TV and a DVD recorder.

A DVD recorder 101 is a reproduction apparatus which reproduces video or audio, and includes a control unit 102, a tuner 103, a recording and reproduction unit 104, an encoder 105, a decoder 106, a user operation unit 107, a switch 108, a data output I/F 109, a command input/output I/F 110, a DVD-RAM disc 111, a data processing unit 112, and an antenna 121. The control unit 102 controls an operation of each component of the DVD recorder 101. The tuner 103 extracts video/audio data of a specified channel from a TV broadcast received by the antenna 121. The recording and reproduction unit 104 writes and reads data to and from the DVD-RAM disc 111. The encoder 105 converts the video/audio data received from the tuner 103 into a format suitable for the recording into the DVD-RAM disc 111. The decoder 106 decodes the data recorded in the DVD-RAM disc 111. The user operation unit 107 is a set of operation buttons on the body of the DVD recorder 101, or a photo detector or the like which receives an instruction signal, such as an infrared signal, from the remote control operated by the user. The switch 108 selects one of the tuner 103 and the decoder 106. The data output I/F 109 outputs the video/audio data to the TV 201 through the data cable 401. The command input/output I/F 110 performs input/output operations of a command with the TV 201 through the command cable 402. The DVD-RAM disc 111 is a recording medium on which data can be recorded. The data processing unit 112 processes the video/audio data, if necessary, and outputs the resultant to the data output I/F 109. The antenna 121 receives a TV broadcast and outputs it to the tuner 103.

A TV 201 is a video display apparatus which displays video, and includes a screen 202, a speaker 203, a control unit 204, a data processing unit 205, a tuner 206, a switch 207, a user operation unit 208, a data input I/Fs 209 and 211, a command input/output I/Fs 210 and 212, and an antenna 121. The control unit 204 controls an operation of each component of the TV 201. The data processing unit 205 processes the video/audio data, if necessary, and outputs the resultant to the screen 202 or the speaker 203. The tuner 206 extracts video/audio data of a specified channel from a TV broadcast received by the antenna 121. The switch 207 selects one of the data input I/F 209, the data input I/F 211, and the tuner 206. The user operation unit 208 is a set of operation buttons on the body of the TV 201, and a photo detector or the like which receives an instruction signal, such as an infrared signal, from the remote control operated by the user. The data input I/F 209 receives the video/audio data from the DVD recorder 101 through the data cable 401. The data input I/F 211 receives the video/audio data from the STB 301 through the data cable 403. The command input/output I/F 210 performs input/output operations of a command with the DVD recorder 101 through the command cable 402. The command input/output I/F 212 performs input/output operations of a command with the STB 301 through the command cable 404. The antenna 121 receives a TV broadcast and outputs it to the tuner 206.

Note that in the TV 201, the command input/output I/F 210 and the command input/output I/F 212 are connected to each other. Therefore, a command outputted from the DVD recorder 101 to the STB 301 is transmitted to the STB 301, and a command outputted from the STB 301 to the DVD recorder 101 is transmitted to the DVD recorder 101, respectively.

Figure 2:
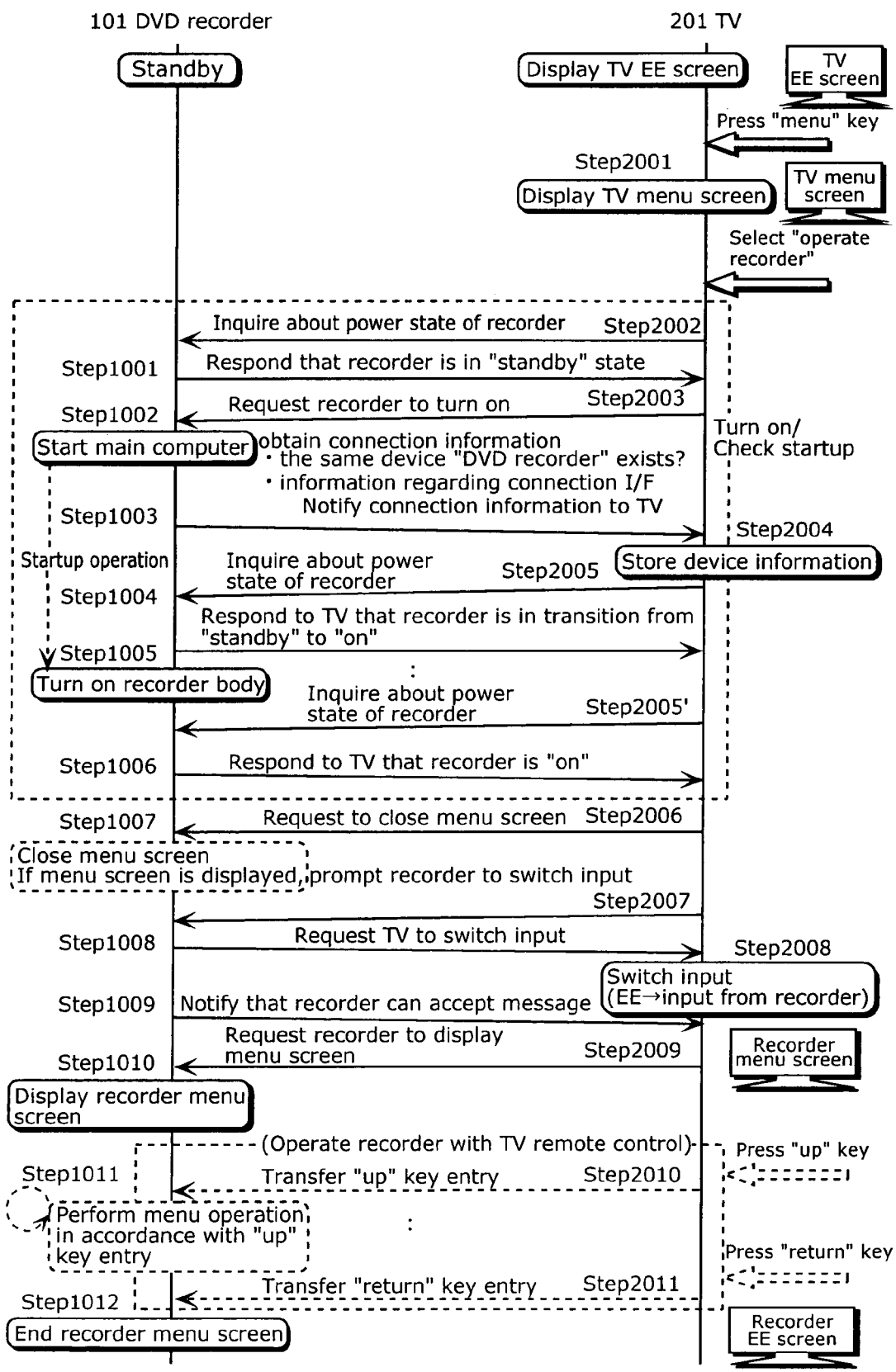
FIG. 2 is an example of a command sequence between the DVD recorder and the TV in the first embodiment.

FIG. 2 is an example of a command sequence between the DVD recorder 101 and the TV 201.

(1) Operations of TV 201

First, the operations of the TV 201 are described.

A user can input, to the user operation unit 208, various instructions such as "switch input", "select channel", "display menu", "close menu", and so forth. When receiving an instruction from the user, the user operation unit 208 outputs such an instruction to the control unit 204. The control unit 204 controls an operation of each component of the TV 201 in accordance with the details of the instruction from the user.

A TV broadcast viewing operation, a manual input switching operation, an external device viewing operation, a menu screen display operation, and an automatic input switching operation are described below.

<TV Broadcast Viewing Operation>

In the case where the input of the switch 207 is set to the tuner 206, a TV broadcast is viewed. The tuner 206 extracts the video/audio data of a specified channel from the TV broadcast received by the antenna 121, and outputs it to the switch 207. The switch 207 outputs the video/audio data received from the tuner 207 to the data processing unit 205.

Of the video/audio data received from the switch 207, the data processing unit 205 outputs the video data to the screen 202 and outputs the audio data to the speaker 203. When this is done, there is the case where the data processing unit 205 processes the video data to be outputted, in accordance with an instruction from the control unit 204, to, for example, additionally display a reception channel number.

<Manual Input Switching Operation>

When receiving an instruction to switch the input from the user through the user operation unit 208, the control unit 204 instructs the switch 207 to switch the input. When receiving, from the control unit 204, the instruction to switch the input to the data input I/F 209 while outputting the input from the tuner 206 to the data processing unit 205, the switch 207 changes its output of the video/audio data received from the data input I/F 209 to the data processing unit 205.

<External Device Viewing Operation>

In the case of viewing video from an external device, the input of the switch 207 is set to the data input I/F 209 or the data input I/F 211. Here, a description is given of an operation to be performed in the case where the input of the switch 207 is set to the data input I/F 209.

The data input I/F 209 receives the video/audio data from the DVD recorder 101 through the data cable 401, and outputs it to the switch 207. The switch 207 outputs the video/audio data received from the data input I/F 209 to the data processing unit 205.

The subsequent operations are the same as those of the TV broadcast viewing operation. The operation to be performed in the case where the input of the switch 207 is set to the data input I/F 211 is also the same as the above operation.

<Menu Screen Display Operation>

The menu screen here refers to: a screen on which setting of the TV 201 is performed; a program list such as an EPG; a screen on which operations of a connected device are performed; and the like.

When receiving a "display menu" instruction from the user operation unit 208, the control unit 204 instructs the data processing unit 205 to create and output a menu screen. The data processing unit 205 creates data for the instructed menu screen, and displays the resulting data onto the screen 202. In addition, the data processing unit 205 outputs the audio data to the speaker 203, if necessary. When this is done, there is the case where the data processing unit 205 incorporates the video/audio data received from the switch 207 into the menu screen as a portion thereof.

After that, in the case where there arises the necessity to close the menu screen such as when receiving a "close menu" instruction from the user operation unit 208, the control unit 204 instructs the data processing unit 205 to end the menu. When receiving the instruction to end the menu, the data processing unit 205 ends the creation and output of the menu screen, and outputs the video/audio data received from the switch 207 to the screen 202 and the speaker 203.

<Automatic Input Switching Operation from Menu>

(Connected Device Information Obtainment)

Figure 3:
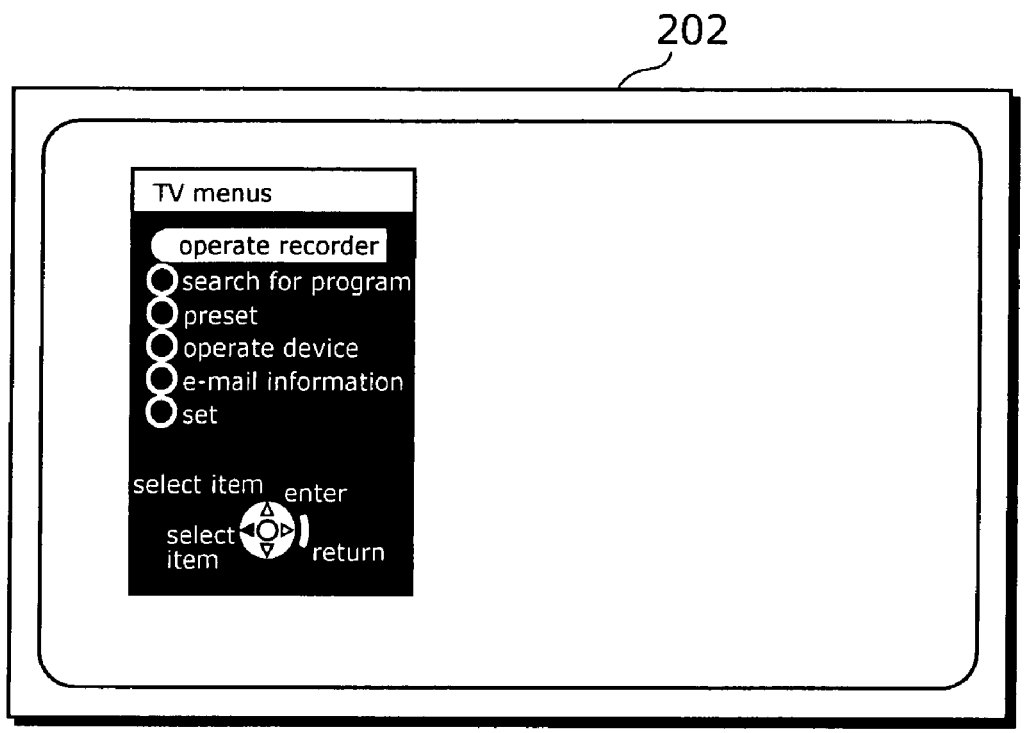
FIG. 3 is a diagram which shows an example of a TV menu screen in the first embodiment.

FIG. 3 is a diagram which shows an example of a TV menu screen. The data processing unit 205 displays an operation menu screen as shown in FIG. 3 onto the screen 202 through the above-described menu screen display operation.

The command input/output I/F 210 of the TV 201 receives, from an external device (the DVD recorder 101 or the STB 301 in FIG. 1) connected thereto through the command cable 402, information of each device sent from the external device as a command (Step 1003 in FIG. 2), at the time when the external device is turned on. In the case where there exists a device which meets a predetermined condition (the DVD recorder 101 here), the command input/output I/F 210 outputs the information regarding that device together with connection location information of that device (here, information indicating that the DVD recorder 101 is connected to the data input I/F 209 and the command input/output I/F 210) to the control unit 204. In the case where this command input/output I/F 210 is a CEC line in an HDMI cable in Non-patent Document 2, information regarding the physical address of the DVD recorder 101 corresponds to the connection location information indicating that the DVD recorder 101 is connected to the command input/output I/F 210. This information is held in the control unit 204 in order to turn on the DVD recorder 101 in conjunction with the input switching even if the DVD recorder 101 is in the standby state when the automatic input switching is performed as described below (Step 2004 in FIG. 2).

<Automatic Input Switching>

When the "menu" key is pressed through the user operation unit 208, the control unit 204 displays a menu screen. In the case where there exists an external device which meets the predetermined condition at that point in time, the control unit 204 instructs the data processing unit 205 to display a GUI button indicating "operate recorder" as shown in FIG. 3 (Step 2001 in FIG. 2).

Here, when the GUI button indicating "operate recorder" is selected and pressed through the user operation unit 208, the control unit 204 instructs the data processing unit 205 to change the screen so as to display the state indicating that the GUI button has been pressed, and shifts into the state for operating the DVD recorder 101 which has been associated with the GUI button in advance.

To be more specific, the command input/output I/F 210 first issues, through the command cable 402, a command to inquire about the power state of the DVD recorder 101 (Step 2002 in FIG. 2). In the case where receiving a response that the DVD recorder 101 is in the standby state (Step 1001 in FIG. 2), the command input/output I/F 210 issues, through the command cable 402, a command to request the DVD recorder 101 to turn on (Step 2003 in FIG. 2). After issuing this command, the command input/output I/F 210 issues, through the command cable 402, commands to inquire about the power state of the DVD recorder 101 on a regular basis until the power-on is confirmed (Step 2002 in FIG. 2). Through this sequence, the DVD recorder 101 can be turned on in conjunction with the input switching.

After confirming the power-on, the command input/output I/F 210 sends an output start instructing command to the DVD recorder 101 through the command cable 402 (Step 2007 in FIG. 2). If the DVD recorder 101 has displayed a menu screen at that point in time, the command input/output I/F 210 sends a menu stop instructing command to the DVD recorder 101 through the command cable 402 in order to clear the menu screen (Step 2006 in FIG. 2).

When receiving the output start instructing command, the DVD recorder 101 starts outputting and sends an output start notifying command (Step 1008 in FIG. 2 to be described later). The DVD recorder 101 further sends a remote control key reception state command indicating that the DVD recorder itself is in the state in which it can accept a transferred remote key entry (Step 1009 in FIG. 2).

In the case where the command received from the command input/output I/F 210 is the output start notifying command, the control unit 204 instructs the switch 207 to switch its input to the input from the data input I/F to which the device which has sent the output start notifying command is connected (Step 2008 in FIG. 2). For example, in the case where the device which has sent the output start notifying command is the DVD recorder 101, the input of the switch 207 is switched to the data input I/F 209. Even if the control unit 204 does not receive the instruction to "close menu" from the user, it instructs the data processing unit 205 to end the menu automatically. When receiving the instruction to end the menu, the data processing unit 205 ends the creation and output of the TV menu screen, and outputs the video/audio data received from the switch 207 to the screen 202 and the speaker 203. Here, the input is not directly switched inside the TV 201 but is switched in accordance with the command from the DVD recorder 101 as shown in Step 2007 and Step 2008, for the purpose of switching the input properly even if a switching device or the like exists between the DVD recorder 101 and the TV 201 (to be described later).

Next, the command input/output I/F 210 issues, through the command cable 402, a menu output requesting command to request the DVD recorder 101 to display a recorder menu screen to the DVD recorder 101 (Step 2009 in FIG. 2). When receiving the menu output requesting command, the DVD recorder 101 starts outputting the recorder menu screen and outputs the recorder menu screen to the screen 202 and the speaker 203 through the data input I/F 209. As described above, unlike the disclosure of Patent Document 1 and Non-patent Document 1 in which a device is switched on the reproduction apparatus side, in the present invention, a device is selected and switched on the TV side.

(Device Operating)

The user operates the DVD recorder 101 through the user operation unit 208 while viewing the recorder menu screen of the DVD recorder 101 displayed on the TV 201.

Figure 4:
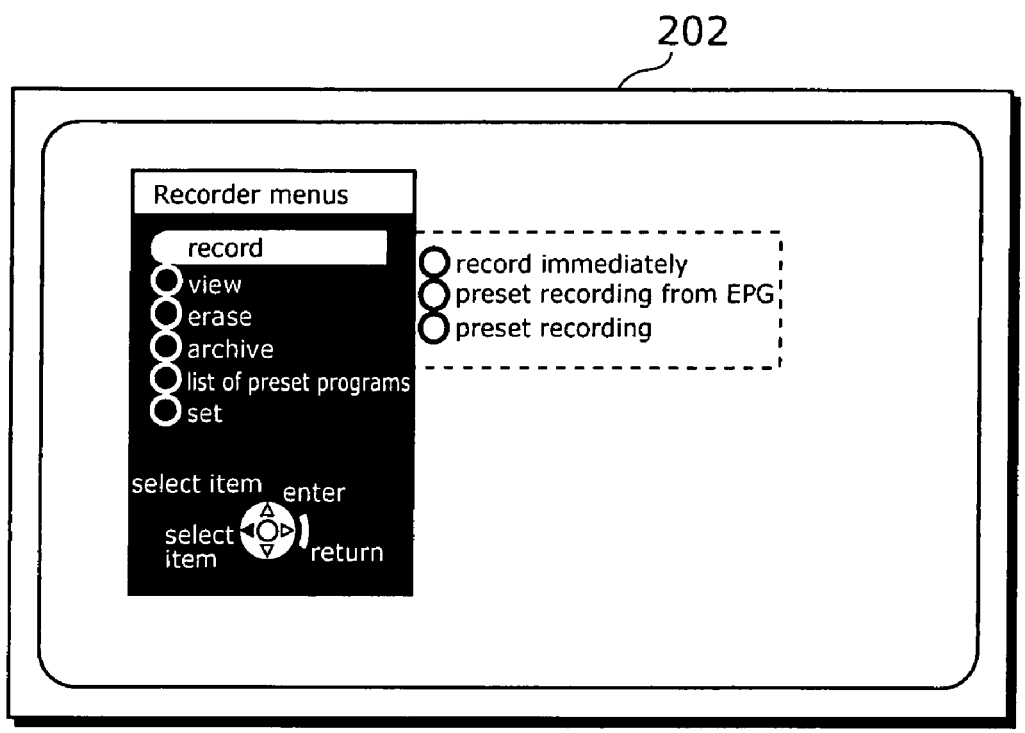
FIG. 4 is a diagram which shows an example of a recorder menu screen in the first embodiment.

FIG. 4 is a diagram which shows an example of a recorder menu screen. In the case where a recorder menu screen as shown in this diagram is displayed, the user performs operations of remote control keys such as direction keys of "up", "down", "right" and "left", an "enter" key, and a "return" key, using the user operation unit 208 (Step 2010 in FIG. 2). The control unit 204 converts the basic key entry received from the user operation unit 208 into a predetermined format, and sends the converted basic key entry to the DVD recorder 101 connected to the command input/output I/F 210 through the command cable 402, using a key code transferring command.

When receiving the key code transferring command through the command cable 402, the DVD recorder 101 reconstitutes the operated key entry and operates in accordance with the reconstituted key entry, as does in accordance with a key entry received from the user operation unit 107 in the DVD recorder itself (Step 1011 in FIG. 2).

Note that if the "menu" key on the TV remote control is pressed during the above operation, the TV menu screen is overlaid on the display of the entry from the DVD recorder 101. During the display of the TV menu screen, the control unit 204 does not transfer the basic key entry inputted through the user operation unit 208 to the DVD recorder 101, but causes the basic key entry to work on the TV menus, as described in <Menu screen display operation> above. In other words, the direction keys, the "enter" key, the "return" key and the like do not work on the recorder menus, but work on the TV menus.

As for the entry of a key other than the basic keys, such as a "power" key, a "channel number" key, a "volume" key and the like for the TV, the control unit 204 does not transfer the key entry inputted through the user operation unit 208 to the DVD recorder, but causes the key entry to work directly on the TV. Causing the user to judge on which the key the user is about to press works, the TV or the reproduction apparatus, every time he/she presses the key goes against the original purpose of better usability to avoid the need of having to use various remote controls. Therefore, as described above, the control unit 204 automatically assigns the working of the key entry to either the TV or the reproduction apparatus in accordance with a predetermined rule. The other rules about, for example, a basic key to be assigned in addition to the above-mentioned keys, depend on the implementation of a device.

(2) Operations of DVD Recorder 101

Next, the operations of the DVD recorder 101 are described.

The user can input, to the user operation unit 107, various instructions such as "start reproduction", "stop reproduction", "display menu", "close menu", and so forth. When receiving an instruction from the user, the user operation unit 107 outputs such instruction to the control unit 102. The control unit 102 controls an operation of each component of the DVD recorder 101 in accordance with the details of the instruction from the user.

A description is given below of a recording operation, a reproduction operation, a menu screen display operation, an operation when neither recording nor reproduction is carried out, and a command sending/receiving operation.

<Operation when Neither Recording Nor Reproduction is Carried Out>

The tuner 103 extracts the video/audio data of a specified channel from the TV broadcast received by the antenna 121, and outputs it to the encoder 105 and the switch 108. In the case where neither recording operation nor reproduction operation is carried out, the switch 108 outputs the video/audio data received from the tuner 103 to the data processing unit 112.

The data processing unit 112 outputs the video/audio data received from the switch 108 to the data output I/F 109. When this is done, there is the case where the data processing unit 112 processes the video/audio data to be outputted, in accordance with an instruction from the control unit 102, to, for example, additionally display a reception channel number. The data output I/F 109 outputs the received video/audio data to the TV 201 through the data cable 401.

When switching a channel to be received, the user inputs an instruction to select a channel to the user operation unit 107. When receiving the instruction to select the channel from the user operation unit 107, the control unit 102 indicates such a channel to be extracted to the tuner 103. The tuner 103 outputs the video/audio data of the indicated channel to the switch 108. Note that a screen onto which the video/audio data received by the tuner is directly outputted is hereinafter referred to as an EE screen.

<Menu Screen Display Operation>

The menu screen here refers to: a screen on which setting of the DVD recorder 101 is performed; a program list such as an EPG; a screen on which the contents recorded on the DVD-RAM disc 111 are listed; and the like.

When receiving a "display menu" instruction from the user operation unit 107, the control unit 102 instructs the data processing unit 112 to create and output a menu screen. The data processing unit 112 creates data for the instructed menu screen, and outputs the resulting data for the menu screen to the data output I/F 109 in replacement of the video/audio data received from the switch 108 (Step 1010 in FIG. 2). When this is done, there is the case where the data processing unit 112 incorporates the video/audio data received from the switch 108 into the menu screen as a portion thereof.

After that, in the case where there arises the necessity to close the menu screen such as when receiving a "close menu" instruction from the user through the user operation unit 107, the control unit 102 instructs the data processing unit 112 to end the menu screen. When receiving the instruction to end the menu screen from the control unit 102, the data processing unit 112 ends the creation and output of the menu screen, and outputs the video/audio data received from the switch 108 to the data output I/F 109.

<Command Sending/Receiving Operation>

At the point in time when the data output I/F 109 starts outputting data reproduced from the DVD-RAM disc 111 or outputting data of the menu screen, the control unit 102 instructs the command input/output I/F 110 to send an output start notifying command. The command input/output I/F 110 sends, through the command cable 402, the output start notifying command to a device connected thereto, such as the TV 201.

At the point in time when the data output I/F 109 finishes outputting the data reproduced from the DVD-RAM disc 111 or outputting the data of the menu screen and starts outputting data of the EE screen, the control unit 102 instructs the command input/output I/F 110 to send the output start notifying command. The command input/output I/F 110 sends the output start instructing command to the TV 201 through the command cable 402, and sends the output start instructing command to the STB 301 through the command cable 404 (Step 1009 in FIG. 2).

In the case where the command which the command input/output I/F 110 has received from another device is a device notifying command, the control unit 102 checks the device which has sent the command so as to know that another device such as the STB 301 is connected.

In the case where the command which the command input/output I/F 110 has received from another device is a remote control key entry transferring command, the control unit 102 controls an operation of each component of the DVD recorder 101 in accordance with the details of the instruction, as is the case with the input from the user operation unit 107. For example, in the case where the "reproduce" key is transferred during the display of the EE screen, the DVD-RAM disc 111 starts the reproduction operation, and the data output I/F 109 outputs the reproduced data. Furthermore, for example, in the case where the "up" key is transferred during the display of a recorder menu screen, the control unit 102 performs predetermined screen control such as moving a cursor up or increasing a value in the menu, and so forth (Step 1011 in FIG. 2).

In the case where the command input/output I/F 110 has received a command from another device and the received command is a menu ending command, the control unit 102 sends, to the data processing unit 112, the same instruction as the instruction to end the menu within the control unit itself. When receiving the instruction to end the menu, the data processing unit 112 ends the creation and output of the menu screen, and outputs the video/audio data received from the switch 108 to the data output I/F 109 (Step 1012 in FIG. 2).

As described above, according to the first embodiment, by displaying a GUI button indicating "operate recorder" or the like on the menu screen of the TV 201 and just selecting this button, the input of the TV 201 is automatically switched to the corresponding output from the DVD recorder 101. After that, by continuing the operation of the user operation unit 208 of the TV 201, it becomes possible to operate the DVD recorder 101, which conventionally requires the trouble of having to change the operation to that of the user operation unit 107 of the DVD recorder 101.

In addition, the user operates the user operation unit 107 while viewing the recorder menu screen itself created by the DVD recorder itself on the TV 201. Therefore, compared with the case where an operation panel for a reproduction apparatus is created on the TV side and the operation details of a TV remote control are transferred to the reproduction apparatus, as disclosed in Non-patent Document 3 and others, the first embodiment of the present invention allows flexible operations depending on the functions of the device. To be more specific, in the case where the generation of a reproduction apparatus is newer than that of a TV, it is not possible to support the additional function of the reproduction apparatus if an operation panel is created on the TV side. On the other hand, by switching the screen to a menu screen created by the reproduction apparatus itself, converting only the details of a is remote control operation and transferring the result, it becomes possible to use such a new function of the reproduction apparatus by operating the old TV remote control. In addition, a spillover effect that a reproduction apparatus operates properly even if a remote control is operated for a TV screen can be obtained.

Note that the DVD recorder 101 may include an external input I/F for establishing a connection with an external device, such that video/audio data outputted from the external device and a TV broadcast received by the tuner 103 can be switched therebetween.

In the first embodiment, the control unit 102 instructs sending of an output start notifying command at the point in time when output of data reproduced from the DVD-RAM disc 111 or data of a menu screen starts, but a method for instructing sending of the output start notifying command is not limited to this method. For example, the same effect can also be obtained by instructing sending of the output start notifying command by another method, such as instructing sending of the output start notifying command at the time when output of the EE screen starts.

Furthermore, a recording medium recorded and reproduced by the DVD recorder 101 is not limited to a DVD-RAM disc, and thus it may be another removable medium such as a DVD-R disc, or may be a fixed medium such as a hard disk. It may also be a recording and reproduction apparatus which can record and reproduce on and from one or more types of recording media. The DVD recorder does not always need to include the encoder, and a reproduction-only apparatus such as a DVD player that performs only the reproduction from a recording medium such as a DVD-RAM may be adopted in replacement of the DVD recorder.

The DVD recorder does not always need to include the tuner, and a monitor for viewing only the inputs from an external device may be adopted in replacement of the TV 201.

TV broadcasts which can be received by the DVD recorder 101, the TV 201 and the STB 301 may be of the same type or of different types of broadcasts.

In the above description, although the TV 201 includes two data input I/Fs, it may include one, or three or more data input I/Fs. These data input I/Fs may be of the same type or of different types. In other words, it is acceptable as long as it is possible to identify the device that has sent the command received by the command input I/F 210 and to switch the input of the TV 201 to such device having sent the command.

Moreover, the number of cables making up the data cable and the command cable may be either one or more, or a bundle of plural signal wires may serve as a single cable. In addition, a structure may be adopted in which data is transmitted as a wireless signal such as an infrared signal, rather than by using a cable.

In the above description, although the TV 201 receives information of each device sent from the external device as a command, at the time when the external device is turned on, the timing when the external device sends such a command may be during the standby state of the external device or other timing. Or, a method may be adopted in which the TV 201 inquires the external device about the timing when the TV 201 receives the information of each device from the external device.

In the sequence of FIG. 2, the order of Step 1003 and Step 2006 may be interchanged, or these may be performed at the same time. Similarly, the order of Step 2006 and Step 2007 may be interchanged, or these may be performed at the same time. Furthermore, there is a possibility that the order of Step 2007 and Steps 1008 and 1009 is interchanged because their operations are performed separately. Such a case does not affect the effects of the present invention.

The timing when Step 1003 and Step 1009 are executed is not limited to the above-mentioned timing, and these steps may be executed during the standby state or immediately after the startup or at other timing.

Second Embodiment

In the second embodiment, as described in the first embodiment, when the TV menu screen is switched to the recorder menu screen, the switching is notified by the DVD recorder by voice. "The switching is notified by the DVD recorder by voice" means, as described later, that a voice notification signal is generated by the DVD recorder.

Figure 5:
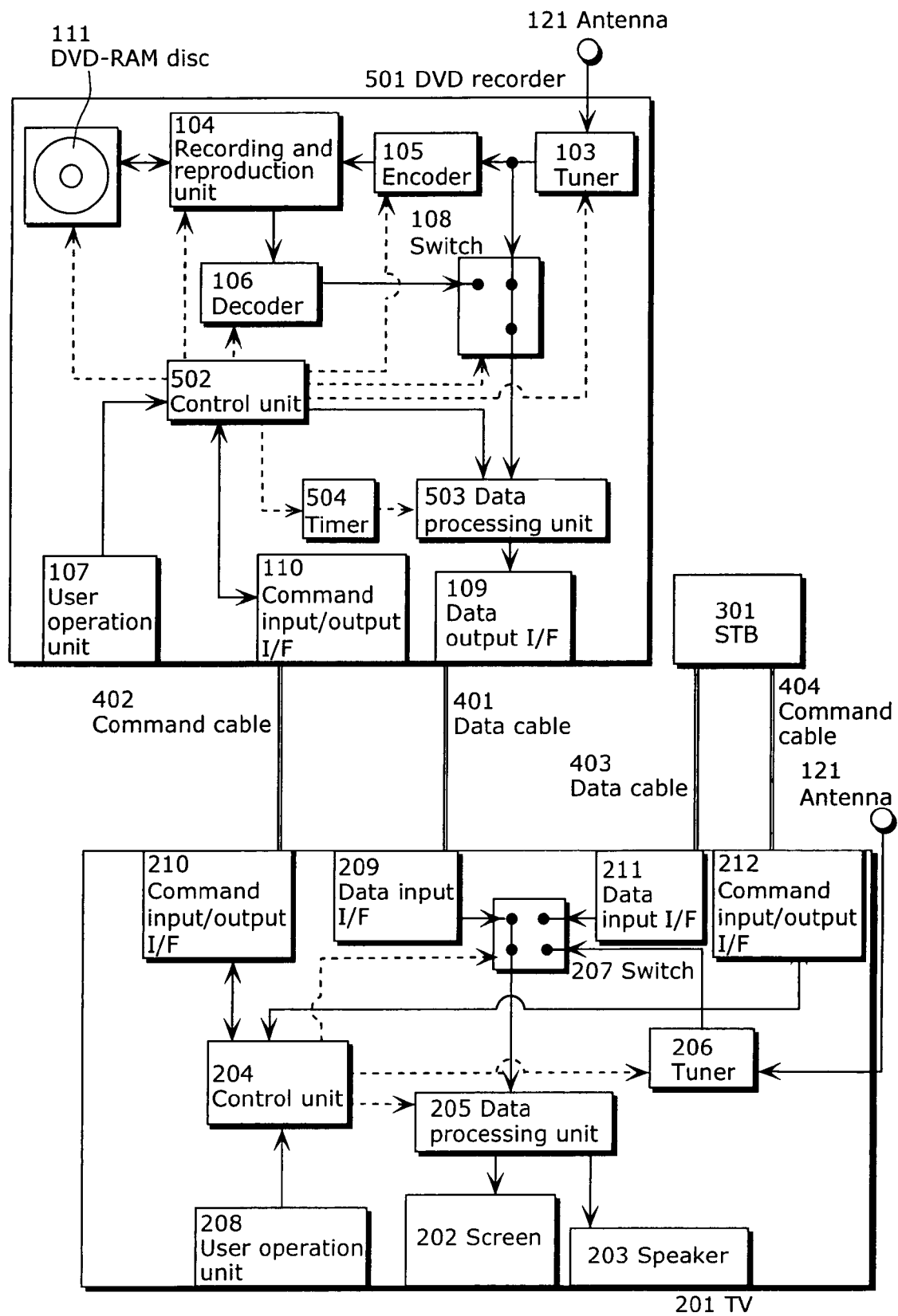
FIG. 5 is a diagram which shows example structures of a TV and a DVD recorder in the second embodiment.

FIG. 5 is a diagram which shows example structures of a TV and a DVD recorder. In FIG. 5, 501 denotes a DVD recorder, 502 denotes a control unit, 503 denotes a data processing unit, and 504 denotes a timer. The other components are the same as those of the first embodiment.

Figure 6:
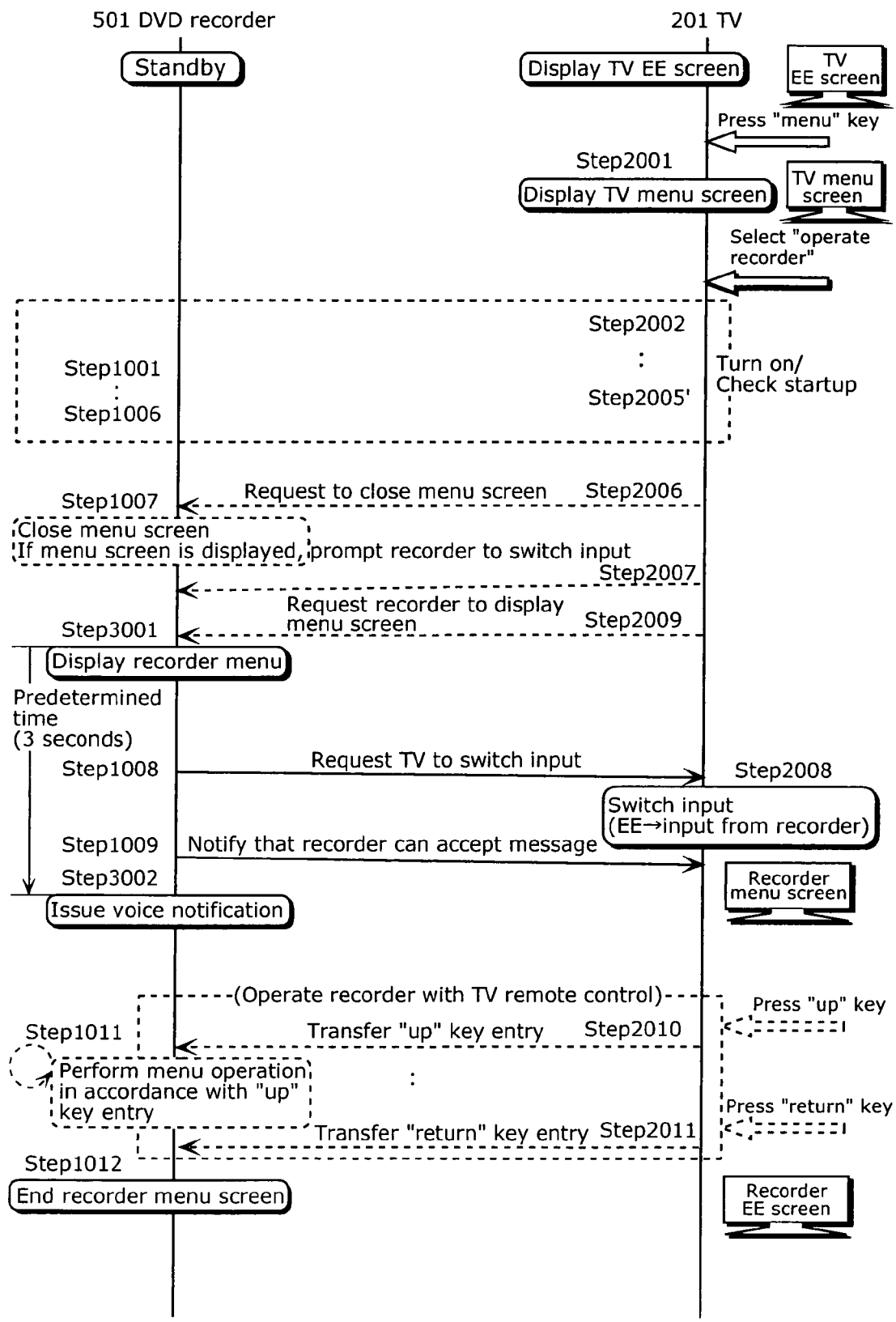
FIG. 6 is an example of a command sequence between the DVD recorder and the TV in the first embodiment.

FIG. 6 is an example of a command sequence between a DVD recorder 501 and the TV 201. All steps are the same as those in FIG. 2 except for Steps 3001 and 3002. However, as described above, there is a possibility that the order of Step 2007 and Steps 1008 and 1009 is interchanged because their operations are performed separately, and therefore a sequence to be executed in the case where the order is interchanged is shown in this diagram.

When the DVD recorder 501 is requested to display a menu screen by the command sent in Step 2009 and the control unit 502 instructs the data processing unit 503 to create and output a menu screen in Step 3001 (which corresponds to Step 1010 in FIG. 2), the data processing unit 503 creates data for the instructed menu screen and outputs the resulting data to the data output I/F 109. At the same time, the control unit 502 instructs the timer 504 to start counting. When receiving the instruction, the timer 504 starts counting and notifies the data processing 503 that a predetermined period of time has passed (the predetermined period of time shall be 3 seconds in the present embodiment). This predetermined period of time is set to a time length determined in anticipation of time required for the TV 201 to switch its input to the input from the data cable 401 of the DVD recorder 501, finish stabilizing synchronization and others, and output video and audio normally.

When receiving a notification from the timer 504, the data processing unit 503 outputs, to the data output I/F 109, a voice notification signal which is stored in the body in advance and indicates that "the screen has been switched to a DVD recorder menu screen" in addition to the menu screen data (Step 3002 in FIG. 6). This voice notification signal does not always need to be stored in the body in advance, and instead it may be generated when the notification is received from the timer 504.

After switching the input to the data cable 401 in accordance with an instruction from the DVD recorder 501, the TV 201 displays video and reproduces audio based on an input signal from the DVD recorder 501 without any special setting and operation. By doing so, the menu screen from the DVD recorder 501 is displayed and a voice notification indicating that "the screen has been switched to a DVD recorder menu screen" is reproduced.

As described above, according to the second embodiment, when a GUI button indicating "operate recorder" is pressed, it is displayed on a screen and notified by voice that the TV menu screen has been switched to the menu screen of the DVD recorder. Therefore, the user can recognize the situation without fail. Since it is configured, for this purpose, so as to wait for the voice notification for a predetermined period of time using the timer 504, it is possible to prevent the entire voice notification or the beginning of the voice notification from being omitted.

Third Embodiment

In the third embodiment, as described in the first embodiment, when the TV menu screen is switched to the recorder menu screen, the switching is notified by the DVD recorder by voice.

Figure 7:
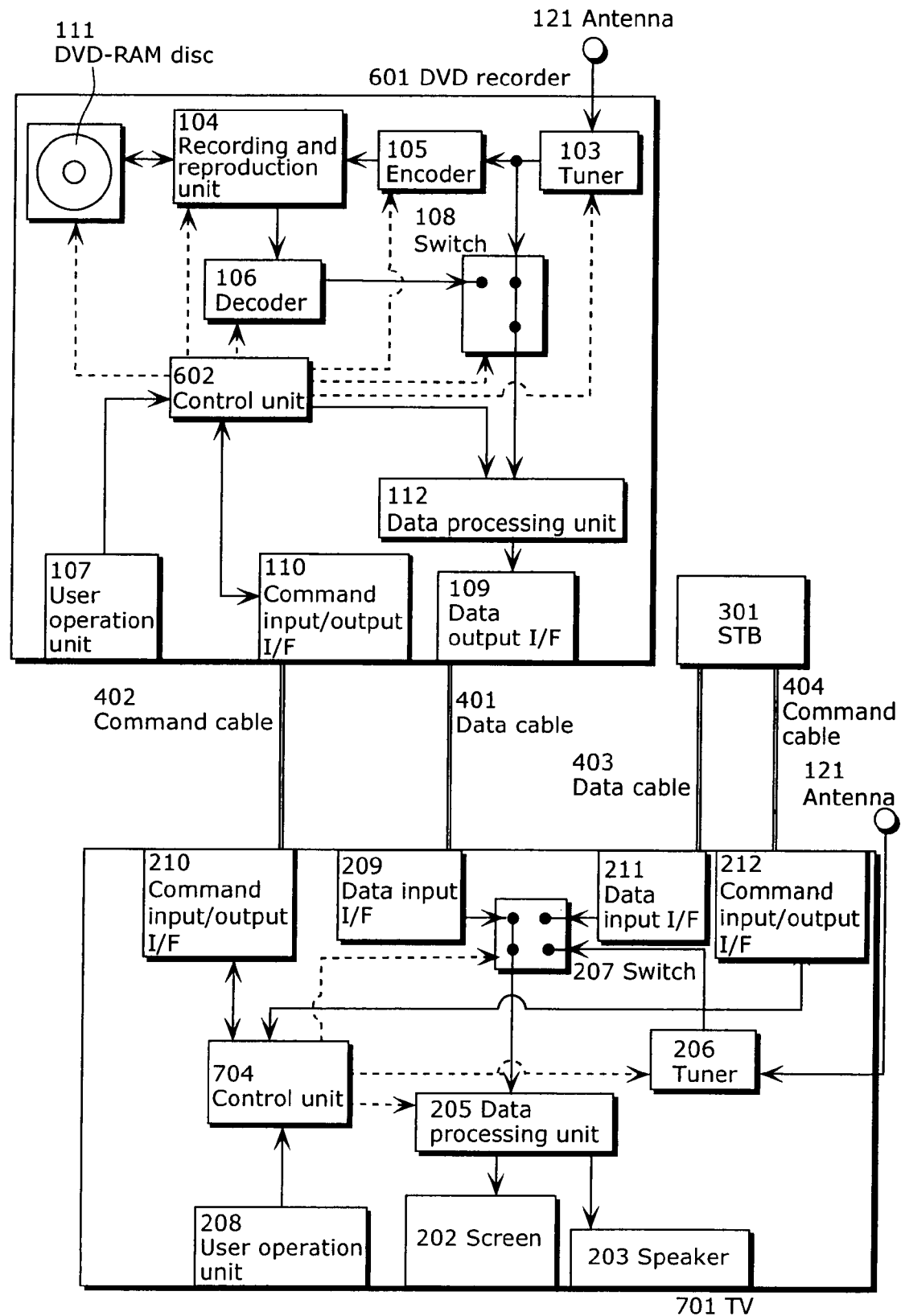
FIG. 7 is a diagram which shows example structures of a TV and a DVD recorder in the third embodiment.

FIG. 7 is a diagram which shows example structures of a TV and a DVD recorder. In FIG. 7, 601 denotes a DVD recorder, 602 denotes a control unit, 701 denotes a TV, and 704 denotes a control unit. The other components are the same as those of the first embodiment.

Figure 8:
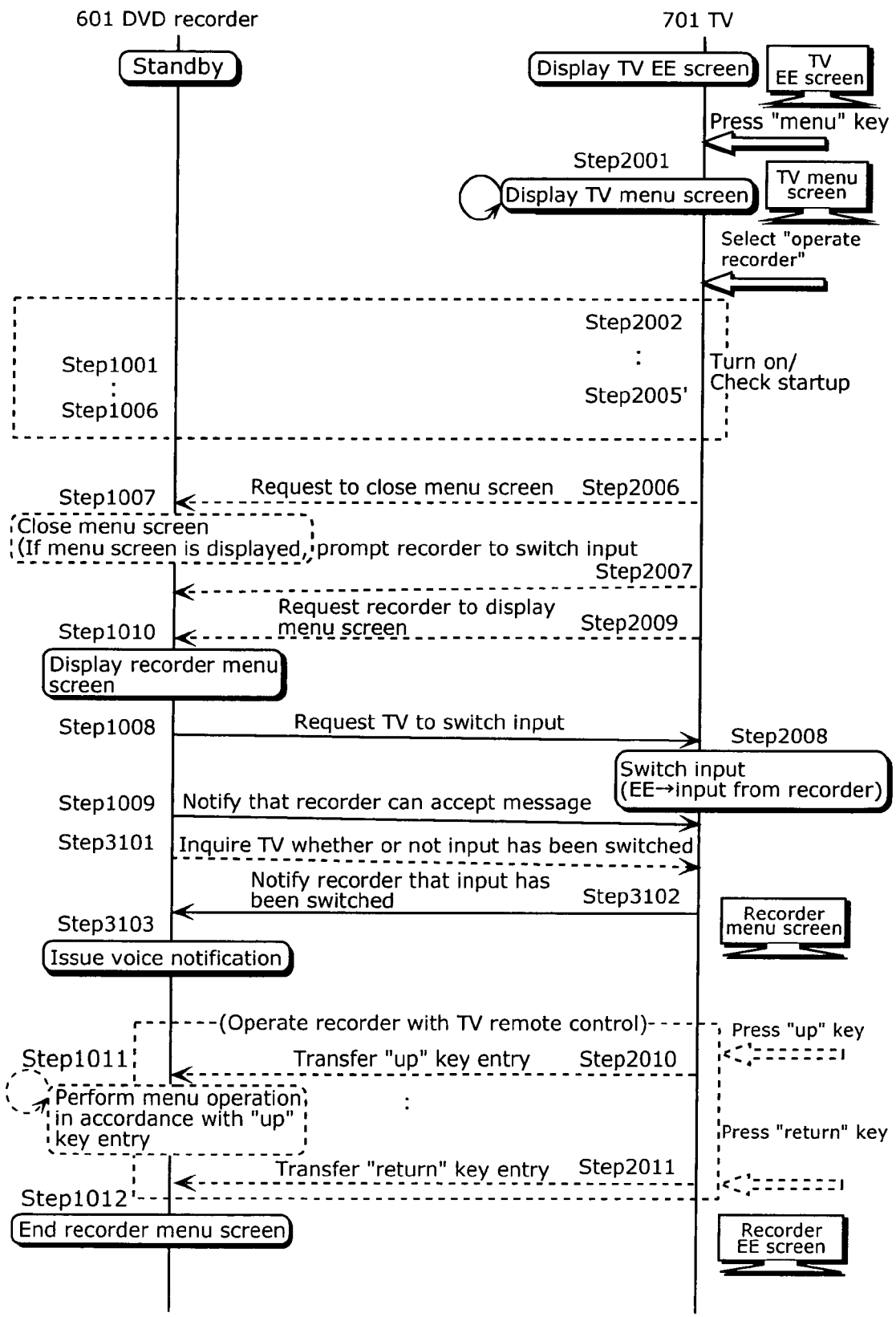
FIG. 8 is an example of a command sequence between the DVD recorder and the TV in the third embodiment.

FIG. 8 is an example of a command sequence between a DVD recorder 601 and a TV 701. All steps are the same as those in FIG. 2 except for Steps 3101, 3102 and 3103. However, as described above, there is a possibility that the order of Step 2007 and Steps 1008 and 1009 is interchanged because their operations are performed separately, and therefore a sequence to be executed in the case where the order is interchanged is shown in this diagram.

When the DVD recorder 601 is requested to display a menu screen by the command sent in Step 2009 and the control unit 602 instructs the data processing unit 112 to create and output a menu screen in Step 1010, the data processing unit 112 creates data for the instructed menu screen and outputs the resulting data to the data output I/F 109. The control unit 602 also creates a command to inquire whether or not the input has been switched, if necessary, and issues it to the TV 701 through the command input/output I/F 110 (Step 3101 in FIG. 8).

After switching the input to the data cable 401 in accordance with an instruction from the DVD recorder 601, the TV 701 creates a notifying command indicating that the input has been switched. The command input/output I/F 210 issues the above notifying command to the DVD recorder 601 through the command cable 402 (Step 3102 in FIG. 8).

When receiving the notifying command through the command input/output I/F 110, the data processing unit 112 of the DVD recorder 601 outputs, to the data output I/F 109, a voice notification signal which is stored in the body in advance and indicates that "the screen has been switched to a DVD recorder menu screen" in addition to the menu screen data (Step 3103 in FIG. 8). This voice notification signal does not need to be stored in the body of the DVD recorder 601 in advance, and instead it may be generated when receiving the notifying command.

Since the TV 701 has already switched its input to the data cable 401 and performed video display and audio reproduction of the input signal from the DVD recorder 601, it displays the menu screen from the DVD recorder 601 and reproduces a voice notification that "the screen has been switched to the DVD recorder menu screen".

As described above, according to the third embodiment, as is the case with the second embodiment, when a GUI button indicating "operate recorder" is pressed, it is displayed on a screen and notified by voice that the TV menu screen has been switched to the menu screen of the DVD recorder. Therefore, the user can recognize the situation without fail. Since it is configured, for this purpose, so as to give the voice notification after confirming the switching using the notifying command, it is possible to prevent the entire voice notification or the beginning of the voice notification from being omitted.

Note that in Step 3102 in FIG. 8, the command does not always need to be sent depending on time required for the TV 701 to switch the input, or it may be sent a number of times.

Fourth Embodiment

In the second or third embodiment, when the TV menu screen is switched to the recorder menu screen, the switching is notified by the DVD recorder by voice. Instead, in the present embodiment, the switching from the TV menu screen to the recorder menu screen is notified by the TV by voice.

Figure 9:
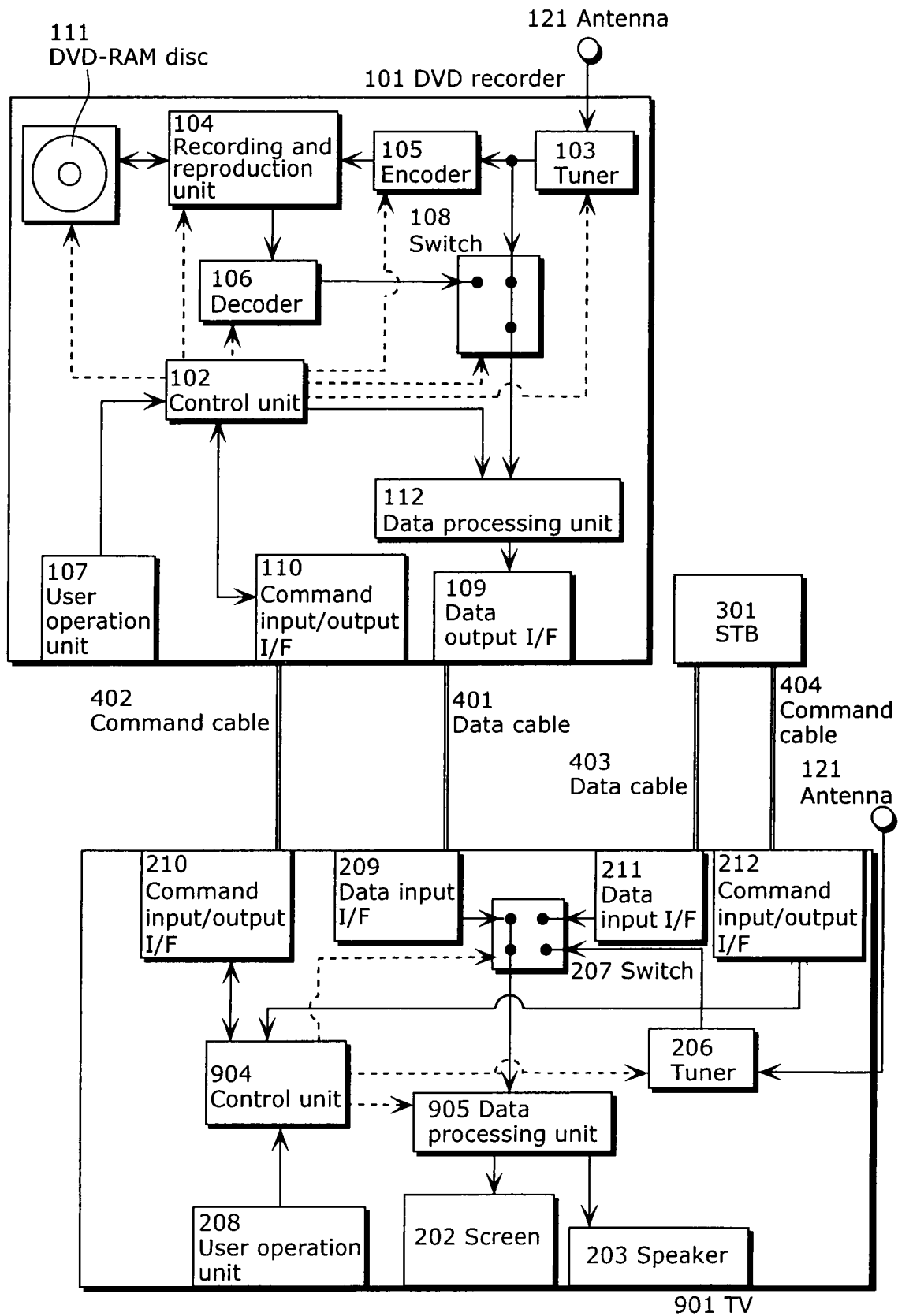
FIG. 9 is a diagram which shows example structures of a TV and a DVD recorder in the fourth embodiment.

FIG. 9 is a diagram which shows example structures of a TV and a DVD recorder. In FIG. 9, 901 denotes a TV, 904 denotes a control unit, and 905 denotes a data processing unit. The structure of the DVD recorder 101 is the same as that of the first embodiment.

Figure 10:
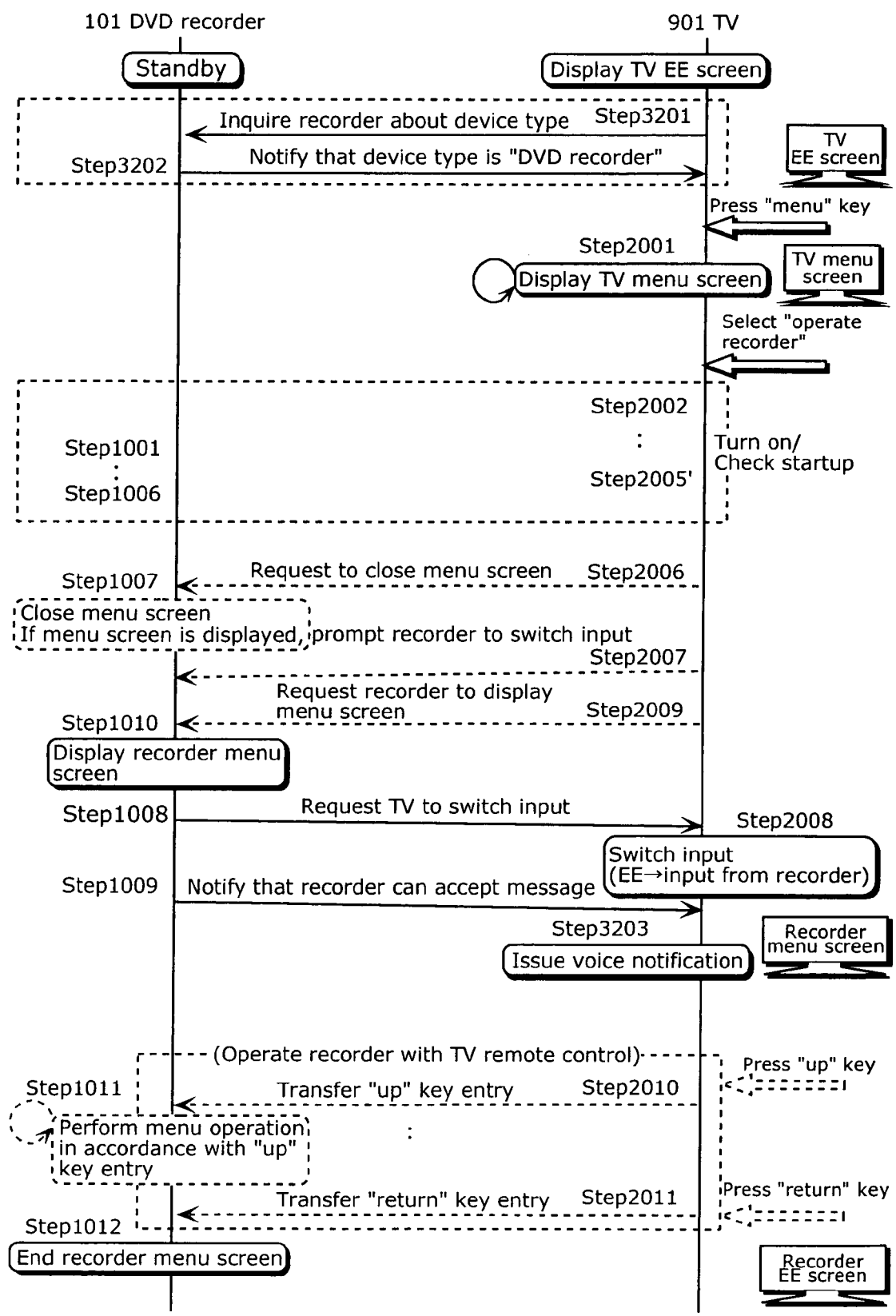
FIG. 10 is an example of a command sequence between the DVD recorder and the TV in the fourth embodiment.

FIG. 10 is an example of a command sequence between the DVD recorder 101 and the TV 901. All steps are the same as those in FIG. 1 except for Steps 3201, 3202 and 3203.

When the DVD recorder 101 is requested to display a menu screen by the command sent in Step 2009 and the control unit 102 instructs the data processing unit 112 to create and output a menu screen in Step 1010, the data processing unit 112 creates data for the instructed menu screen and outputs the resulting data to the data output I/F 109.

The TV 901 switches the input to the data cable 401 in accordance with an instruction from the DVD recorder 101. After switching the input, the data processing unit 905 of the TV 901 outputs, to the speaker 203, a voice notification signal which is stored in the body in advance and indicates that "the input has been switched to the input 1" in addition to the data from the data input I/F 209, in accordance with an instruction from the control unit 904 (Step 3203 in FIG. 10). This voice notification signal does not need to be stored in the body of the TV 901 in advance, but instead it may be generated upon receiving the instruction from the control unit 904.

The message is not limited to the above one, i.e., "the input has been switched to the input 1", and instead it may be another message. For example, in the case where it is found that the type of a device connected to the input 1 is a DVD recorder, as a result of the execution of the sequence (Steps 3201 and 3202 in FIG. 10) in which the control unit 904 inquires in advance about the type of the device connected to the command cable 402 (or the data cable 401), a voice notification signal indicating that "the screen has been switched to the menu screen of the DVD recorder" may be generated.

As described above, according to the fourth embodiment, as is the case with the second and third embodiments, when a GUI button indicating "operate recorder" is pressed, it is displayed on a screen and notified by voice that the TV menu screen has been switched to the menu screen of the DVD recorder. Therefore, the user can recognize the situation without fail.

Note that in Steps 3201 and 3202 in FIG. 10, the commands do not always need to be sent depending on the created messages, or instead they may be sent a number of times. The commands are issued in Steps 3201 and 3203 in FIG. 10, but instead, they may be issued at other timing such as after the startup of the DVD recorder (after Step 1008).

Fifth Embodiment

In the fifth embodiment, as described in the fourth embodiment, when the TV menu screen is switched to the recorder menu screen, the switching is notified by the TV by voice.

Figure 11:
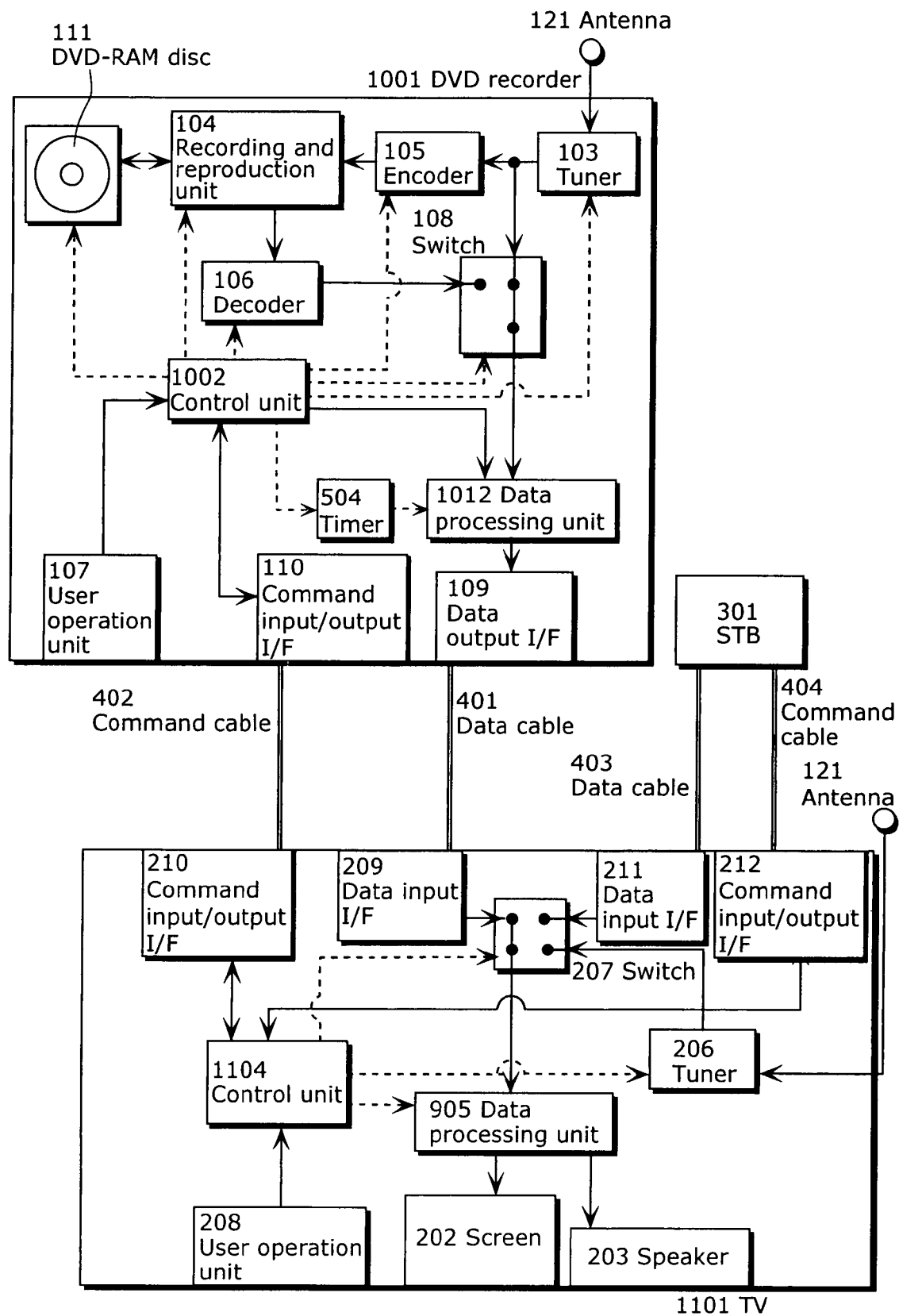
FIG. 11 is a diagram which shows example structures of a TV and a DVD recorder in the fifth embodiment.

FIG. 11 is a diagram which shows example structures of a TV and a DVD recorder. In FIG. 11, 1001 denotes a DVD recorder, 1002 denotes a control unit, 1101 denotes a TV, and 1104 denotes a control unit.

Figure 12:
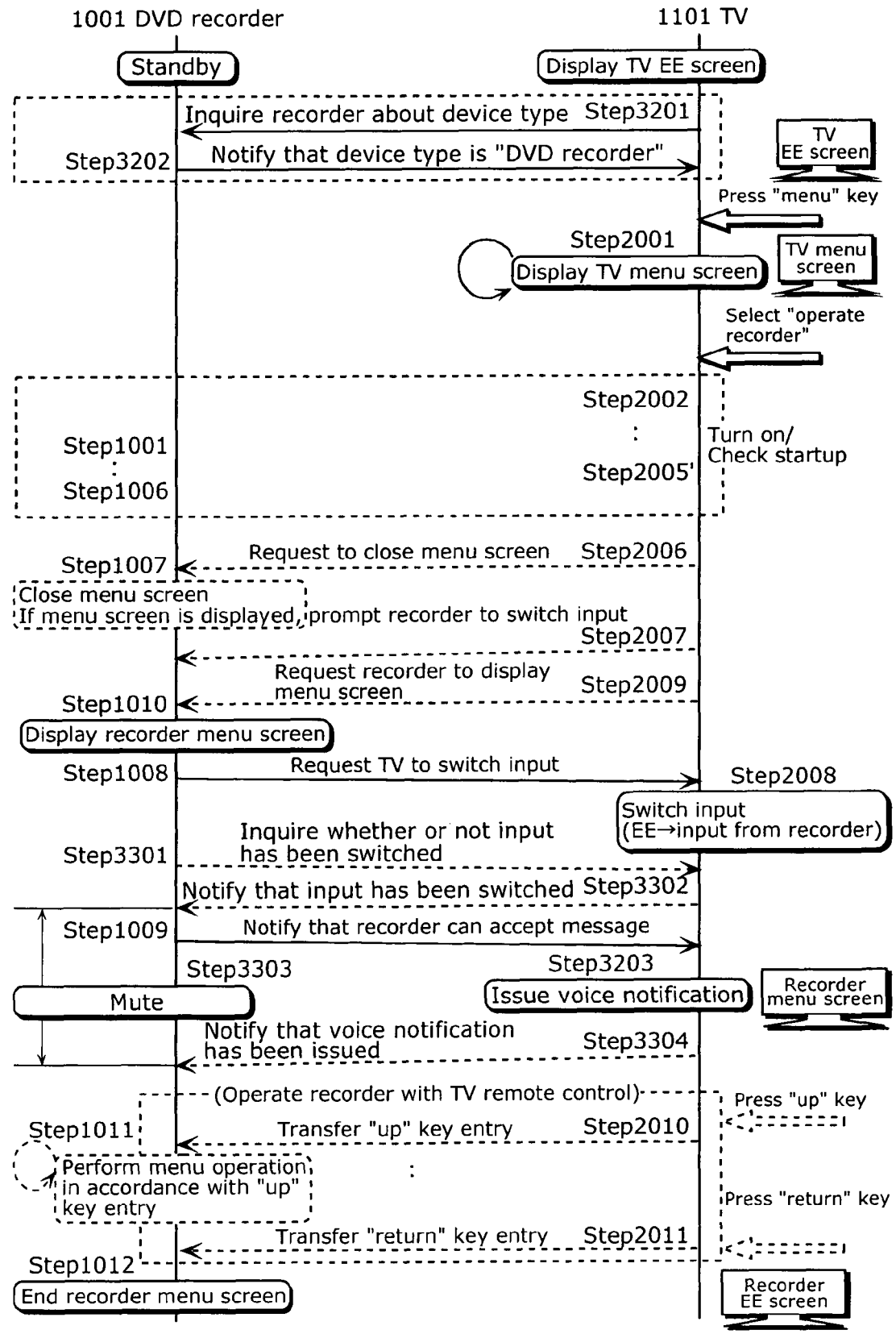
FIG. 12 is an example of a command sequence between the DVD recorder and the TV in the fifth embodiment.

FIG. 12 is an example of a command sequence between the DVD recorder 1001 and the TV 1101. All steps are the same as those in FIG. 10 except for Steps 3301, 3302, 3303 and 3304.

When the DVD recorder 1001 is requested to display a menu screen by the command sent in Step 2009 and the control unit 1002 instructs the data processing unit 1012 to create and output a menu screen in Step 1010, the data processing unit 1012 creates data for the instructed menu screen and outputs the resulting data to the data output I/F 109. The data processing unit 1012 also creates a command to inquire whether or not the input has been switched, if necessary, and issues it to the TV 1101 through the command input/output I/F 110 (Step 3301 in FIG. 10).

After switching the input to the data cable 401 in accordance with an instruction from the DVD recorder 1001, the TV 1101 creates a notifying command indicating that the input has been switched. The command input/output I/F 210 issues the above notifying command to the DVD recorder 1001 through the command cable 402 (Step 3302 in FIG. 12).

When receiving the notifying command indicating that the input has been switched through the command output I/F 110, the control unit 1002 of the DVD recorder 1001 instructs the data processing unit 1012 to mute the audio on the menu. If the data processing unit 1012 receives no such instruction, it decodes the audio of the TV signal displayed on the recorder menu screen and outputs the decoded audio.

The data processing unit 905 of the TV 1101 outputs, to the speaker 203, a voice notification signal which is stored in the body in advance and indicates that "the input has been switched to the input 1" in addition to the data from the data input I/F 209, in accordance with an instruction from the control unit 1104 (Step 3203 in FIG. 12). This voice notification signal does not need to be stored in the body in advance, but instead it may be generated upon receiving the instruction from the control unit 1104.

The control unit 1002 of the DVD recorder 1001 counts a predetermined period of time using the timer 504, and when the predetermined period of time has passed, it instructs the data processing unit 1012 to cancel mute setting. Or, as described in Step 3304 in FIG. 12, when receiving a command notifying that reproduction of the voice notification signal is finished, the control unit 1002 instructs the data processing unit 1012 to cancel mute setting.

As described above, according to the fifth embodiment, as is the case with the fourth embodiment, when a GUI button indicating "operate recorder" is pressed, it is displayed on a screen and notified by voice that the TV menu screen has been switched to the menu screen of the DVD recorder. Therefore, the user can recognize the situation without fail. Since it is configured, for this purpose, so as to mute the audio while counting time required for voice notification or cancel mute setting after confirming that the input has been switched, using the notifying command, it is possible to prevent the voice notification from being poorly heard.

Note that in Step 3304 in FIG. 12, the command does not always need to be sent depending on time required for the TV 1101 to switch the input, or instead it may be sent a number of times.

In Steps 3301 and 3302 in FIG. 12, the commands do not always need to be sent depending on time required for the TV 1101 to switch the input, or instead they may be sent a number of times.

The user operation unit in the first to fifth embodiments is one example of the user input unit in the present invention. The control unit in the first to fifth embodiments is one example of the screen creation unit, the voice guidance creation unit and the device information obtainment unit in the present invention. The switch in the first to fifth embodiments is one example of the switching unit in the present invention. The screen in the first to fifth embodiments is one example of the first display unit and the second display unit in the present invention. The speaker in the first to fifth embodiments is one example of the voice output unit in the present invention.

Sixth Embodiment

In the present embodiment, menus displayed on a TV screen and transitions from a menu screen to another are described in more detail. The following describes the present embodiment by focusing on the differences from the first embodiment.

Figure 13:
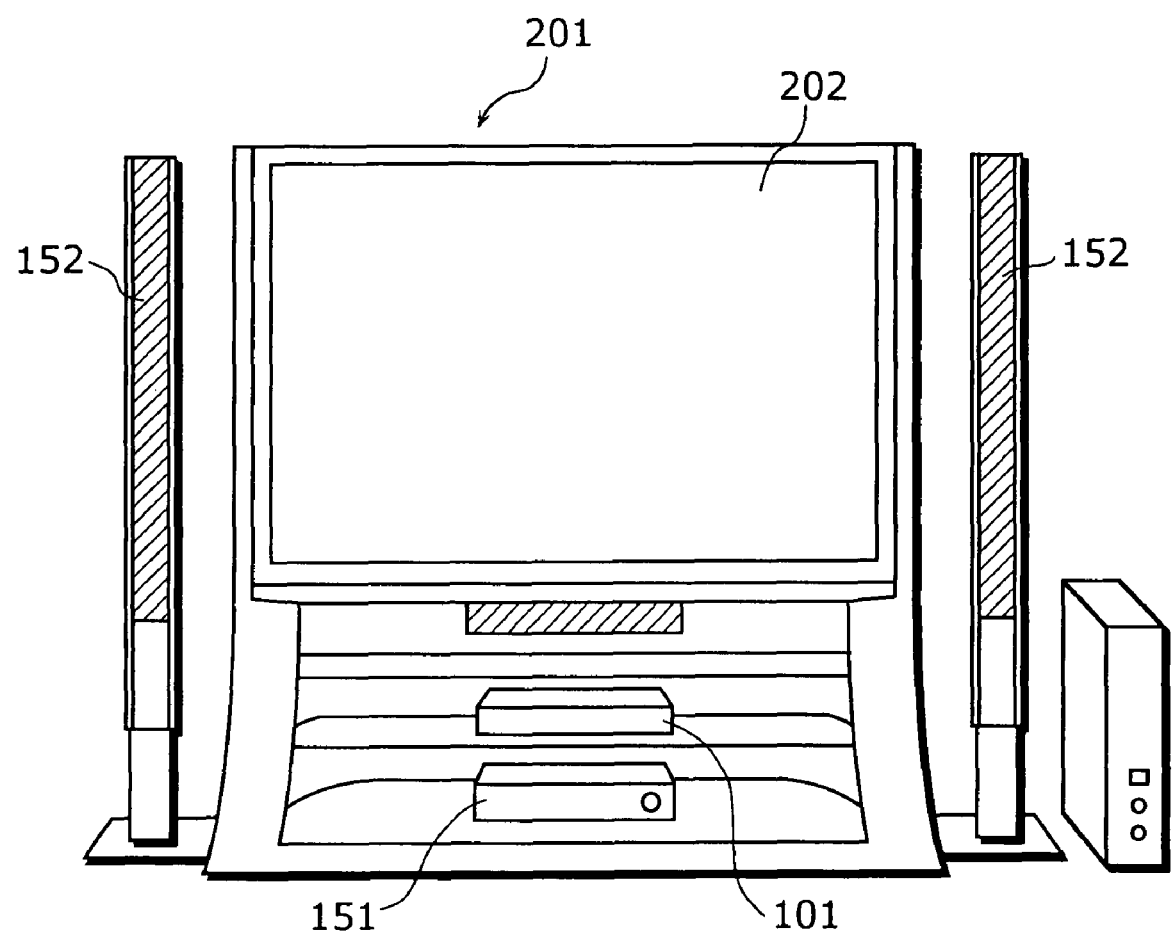
FIG. 13 is an external view of an AV system in the sixth embodiment.

FIG. 13 is an external view of an AV system in the present embodiment. This AV system includes the TV 201, the DVD recorder 101, the AV amplifier 151, and the external speaker 152. The AV amplifier 151 is a device which controls the external speaker 152, and is connected to the TV 201 and the DVD recorder 101 through an HDMI cable or the like. To be more specific, the TV 201, the AV amplifier 151 and the DVD recorder 101 can communicate commands with each other through a command cable (a CEC line in the HDMI cable).

Figure 14:
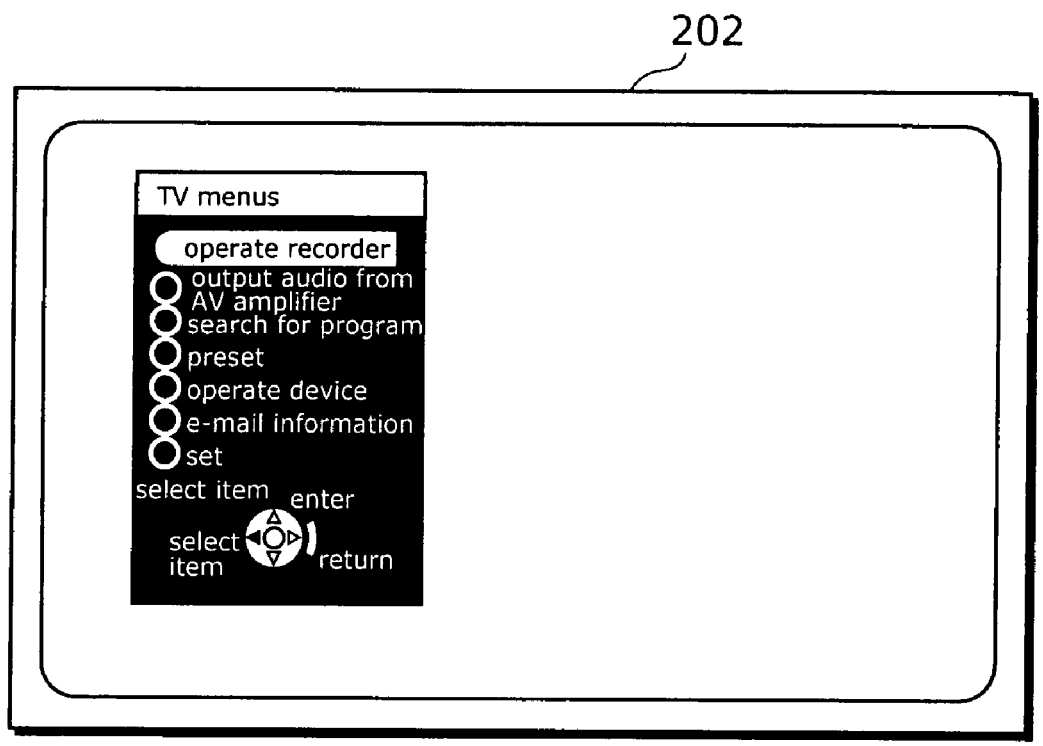
FIG. 14 is a diagram which shows an example of a TV menu screen in the sixth embodiment.

FIG. 14 is a diagram which shows an example of a TV menu screen in the present embodiment. Here, a case in which the DVD recorder 101 and the AV amplifier 151 are connected to the TV 201 is assumed. Therefore, the control unit 102 of the TV 201 obtains the device information regarding the DVD recorder 101 and the device information regarding the AV amplifier 151, and creates a TV menu screen using these device information. As a result, as the TV menus, an item of "output audio from AV amplifier" is included in addition to the item of "operate recorder". In the case where the item of "output audio from AV amplifier" is not selected, audio is outputted from the speaker 203 of the TV 201. On the other hand, in the case where the item of "output audio from AV amplifier" is selected, audio is outputted from the external speaker 152 connected to the AV amplifier 151.

Figure 15:
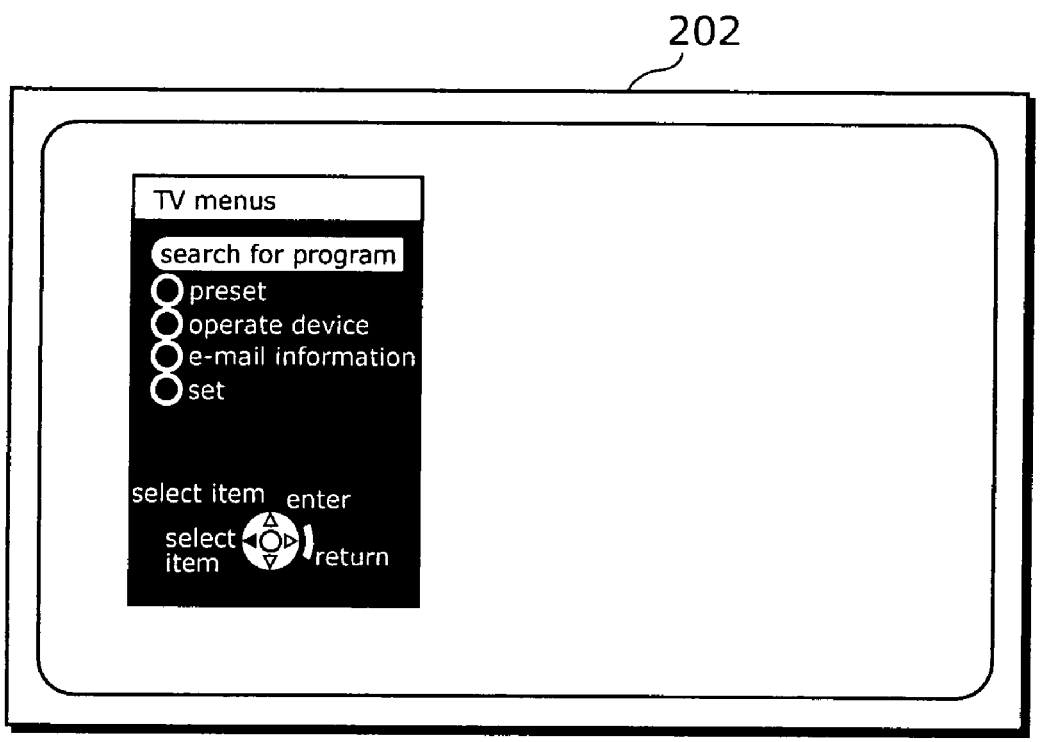
FIG. 15 is a diagram which shows an example of another TV menu screen in the sixth embodiment.

FIG. 15 is a diagram which shows an example of another TV menu screen in the present embodiment. Here, a case in which neither the DVD recorder 101 nor the AV amplifier 151 are connected to the TV 201 is assumed. Therefore, the control unit 102 of the TV 201 obtains neither the device information regarding the DVD recorder 101 nor the device information regarding the AV amplifier 151. As a result, as the TV menus, neither the item of "operate recorder" nor the item of "output audio from AV amplifier" is included.

As described above, the TV menu items depend on the connected device. To be more specific, just by connecting the DVD recorder 101, the AV amplifier 151 and the like to the TV 201, it is possible to present the menu items which depend on these devices to the user. In other words, the menu items which depend on the DVD recorder 101, the AV amplifier 151 and the like are not presented to the user under the state in which these devices are not connected to the TV 201, and therefore the user is not confused about which device to aim for.

Figure 16:
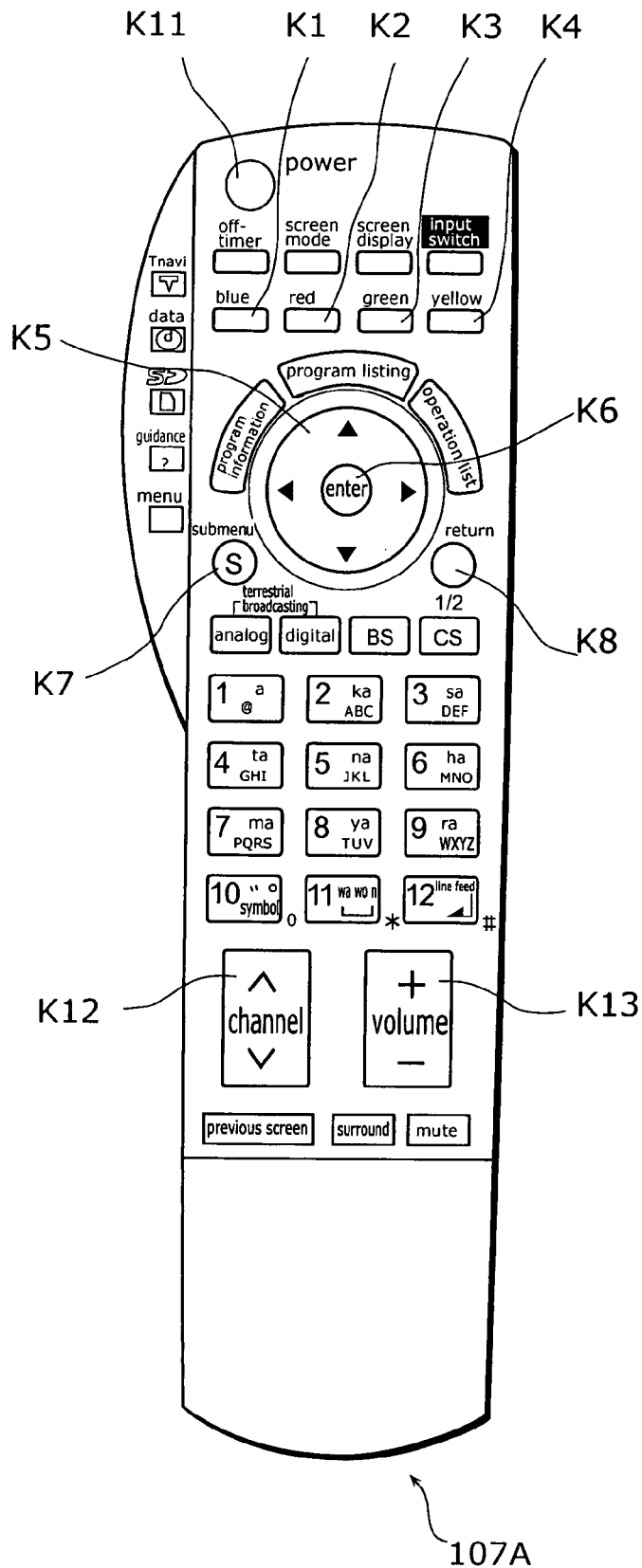
FIG. 16 is an external view of a TV remote control in the sixth embodiment.

FIG. 16 is an external view of a remote control of the TV 201. This remote control 107A includes basic keys such as four color keys K1 to K4, an "up", "down", "right" and "left" direction key K5, an "enter" key K6, a "submenu" key K7, a "return" key K8, and so forth. The keys other than the basic keys are a "power" key K11 for the TV 201, a "channel" key K12, a "volume" key K13 and so forth. This remote control 107A can also be used as the TV remote control in the first to fifth embodiments.

FIG. 17 is a diagram which shows the transitions of menu screens displayed on the screen 202 of the TV 201. Here, a case in which the DVD recorder 101 is connected to the TV 201 is shown.

Figure 17A:
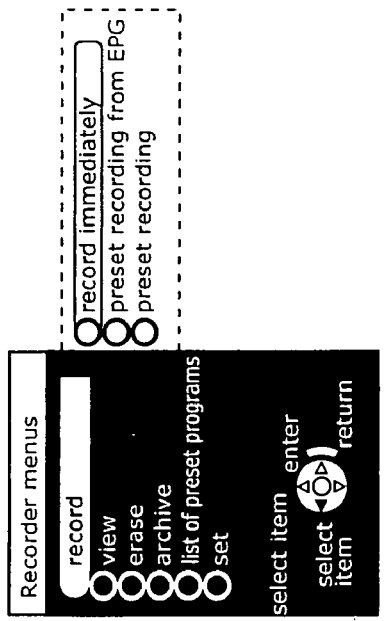
FIG. 17 is a diagram which shows transitions from a menu screen to another in the sixth embodiment.

First, a TV menu screen is displayed on the screen 202 of the TV 201, as shown in FIG. 17(A). This TV menu screen includes items such as "operate recorder", "search for program", "preset" and the like. A user can select a desired item from among the TV menu items by operating the direction key K5 of the remote control 107A. When pressing the enter key K6 of the remote control 107A while selecting the desired item, the user can confirm that item. It is assumed here that the user presses the enter key K6 of the remote control 107A while selecting the item of "operate recorder".

Figure 17B:
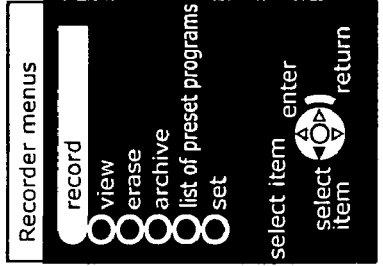

By doing this, a recorder menu screen is displayed on the screen 202 of the TV 201, as shown in FIG. 17(B). This recorder menu screen includes items such as "record", "view", "erase", and so forth. When the item of "record" is selected, submenus such as "record immediately", "preset recording from EPG", "preset recording", and so forth are displayed. It is assumed here that the user presses the enter key K6 of the remote control 107A while selecting the item of "record".

Figure 17C:
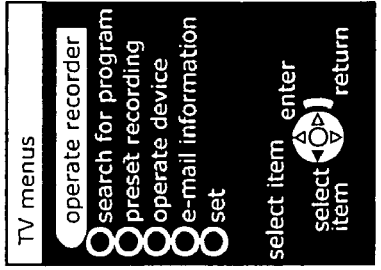

By doing this, the user is in the condition in which he/she can select the item such as "record immediately", "preset recording from EPG", "preset recording" and so forth, as shown in FIG. 17(C). The state in which the item of "record immediately" is selected is shown here.

As described above, by operating the basic keys of the remote control 107A (in this example, the direction key K5 and the enter key K6), the user can shift from the TV menu screen to the recorder menu screen. To return from the recorder menu screen to the TV menu screen, the user just has to press the return key K8 of the remote control 107A. In other words, when the return key K8 of the remote control 107A is pressed once, the menu screen goes back to the previous one.

Figure 17D:
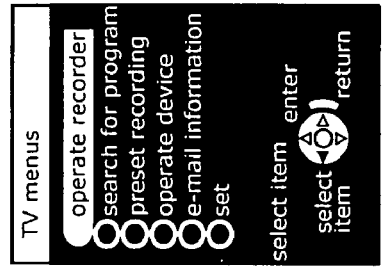

For example, pressing the return key K8 of the remote control 107A while selecting the item of "record immediately" means selecting the item of "record", as shown in FIG. 17(D). In other words, the menu screen goes back to the previous one.

Figure 17E:
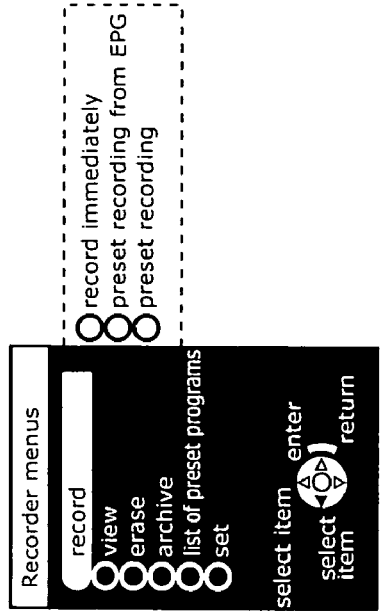

Furthermore, pressing the return key K8 of the remote control 107A in this state means selecting the item of "operate recorder", as shown in FIG. 17(E). In other words, the menu screen goes back to the TV menu screen.

At this time, it is preferable that a voice notification that "the screen has switched to a TV menu screen" is reproduced. For that purpose, as described in the second to fifth embodiments, it is necessary to generate a voice notification signal indicating that "the screen has been switched to the TV menu screen" on the side of the TV 201 or the DVD recorder 101. It is preferable that this voice notification is reproduced immediately after the TV menu screen is displayed on the screen 202 of the TV 201. The timing when the TV menu screen is displayed can be detected by the control unit 102 of the TV 201.

As described above, it is possible to return the current menu screen to a previous one by the number of presses of the return key K8 of the remote control 107A. Therefore, even if the recorder menu screen is displayed on the screen 202 of the TV 201, it is possible to return the recorder menu screen to the TV menu screen, if necessary. In addition, when the screen returns to the TV menu screen, the voice notification that "the screen has been switched to the TV menu screen" is given. Therefore, the user can quickly figure out which menu screen he/she is operating, a TV menu screen or a recorder menu screen.

Note that when a key other than the basic keys of the remote control 107A is pressed while the recorder menu screen is displayed on the screen 202 of the TV 201, the function assigned to that pressed key is executed. For example, when the channel number key K12 of the remote control 107A is pressed under the state in which the recorder menu screen is displayed on the screen 202 of the TV 201, video/audio data of that channel is extracted by the tuner 206 of the TV 201.

INDUSTRIAL APPLICABILITY

The present invention has an effect that a reproduction apparatus can be operated using only a TV remote control, and is applicable for use as a TV, a DVR and the like.

The invention claimed is:

1. A video display apparatus which displays video, said apparatus comprising:
   a display unit operable to display a menu screen of said video display apparatus;
   a switching unit operable to switch a current input to an input from an input source device from which video is inputted; and
   a command input/output unit operable to (i) determine whether the input source device is powered on, and (ii) output, to the input source device, a command to instruct the input source device to start video output upon determining that the input source device is powered on,
   wherein said switching unit is operable to switch the current input to the input from the input source device upon receiving, from the input source device, a command to notify the start of the video output, and
   wherein said display unit is operable to display a menu screen of the input source device upon said switching unit switching the current input to the input from the input source device.

2. The video display apparatus according to claim 1,
   wherein said command input/output unit is further operable to output, to the input source device, a command to request the input source device to turn on upon determining that the input source device is not powered on.

3. The video display apparatus according to claim 1,
   wherein said command input/output unit is further operable to output, to the input source device, a command to request the input source device to output the menu screen of the input source device to said video display apparatus.

4. The video display apparatus according to claim 1, further comprising
   a user input unit operable to receive an instruction inputted by a user,
   wherein said command input/output unit is further operable to convert the instruction received by said user input unit into a predetermined format, and to transfer the converted instruction to the input source device.

5. The video display apparatus according to claim 1, further comprising:
a voice guidance creation unit operable to create voice guidance data indicating that said switching unit has switched to the input from the input source device; and
a voice output unit operable to output the voice guidance data created by said voice guidance creation unit.

6. The video display apparatus according to claim 1, further comprising:
a device information obtainment unit operable to obtain device information which is information regarding the input source device; and
a screen creation unit operable to create the menu screen of said video display apparatus using the device information obtained by said device information obtainment unit.

7. A reproduction apparatus which reproduces video, said apparatus comprising:
a screen creation unit operable to create a menu screen of said reproduction apparatus;
a voice guidance creation unit operable to create voice guidance data indicating that a current input has been switched to an input from said reproduction apparatus or that a current menu screen has been switched to the menu screen of said reproduction apparatus; and
a data output unit operable to output the menu screen of said reproduction apparatus to a video display apparatus, and to output the voice guidance data created by said voice guidance creation unit to the video display apparatus,
wherein said data output unit is operable to output the voice guidance data created by said voice guidance creation unit to the video display apparatus when a predetermined time has passed since outputting the menu screen of said reproduction apparatus to the video display apparatus.

8. The reproduction apparatus according to claim 7,
wherein said data output unit is further operable to output the voice guidance data created by said voice guidance creation unit to the video display apparatus, upon receiving, from the video display apparatus, a command indicating that the current input has been switched.

9. A reproduction apparatus which reproduces video, said apparatus comprising:
a screen creation unit operable to create a menu screen of said reproduction apparatus;
a voice guidance creation unit operable to create voice guidance data indicating that a current input has been switched to an input from said reproduction apparatus or that a current menu screen has been switched to the menu screen of said reproduction apparatus;
a data output unit operable to output the menu screen of said reproduction apparatus to a video display apparatus, and to output the voice guidance data created by said voice guidance creation unit to the video display apparatus; and
a control unit operable to mute audio upon receiving, from the video display apparatus, the command indicating that the current input has been switched.

10. A video display method for use in a video display apparatus which displays video, said method comprising:
displaying, using a display unit, a menu screen of the video display apparatus;
determining, using a command/input output unit, whether an input source device from which video is inputted is powered on;
outputting, using the command/input unit, to the input source device, a command to instruct the input source device to start video output upon determining that the input source device is powered on;
switching, using a switching unit, from a current input to an input from the input source device upon receiving, from the input source device, a command to notify the start of video output; and
displaying, using the display unit, a menu screen of the input source device upon switching from the current input to the input from the input source device.

11. A video display apparatus comprising:
a switching unit operable to switch a current input to an input from an external device;
a display unit operable to display a menu screen of said video display apparatus when said switching unit is switched to the current input and display a menu screen of the external device when said switching unit is switched to the input from the external device;
a user input unit operable to receive an instruction inputted by a user to control the external device; and
a command input/output unit operable to:
(i) convert the instruction received by said user input unit into a predetermined format, and to transfer the converted instruction to the external device;
(ii) determine whether the external device is powered on; and
(iii) output, to the external device, a command to instruct the external device to start video output upon determining that the external device is powered on,
wherein said switching unit is operable to switch the current input to the input from the external device when said user input device receives the instruction by the user to control the external device, or to switch the current input to the input from the external device upon receiving, from the input source device, a command to notify the start of the video output.

12. The video display apparatus according to claim 11, further comprising:
a device information obtainment unit operable to obtain device information which is information regarding the external device; and
a screen creation unit operable to create the menu screen of said video display apparatus using the device information obtained by said device information obtainment unit.

13. A video display system comprising:
a reproduction apparatus; and
a video display apparatus,
said reproduction apparatus including:
a reproduction unit operable to reproduce video data from a recording medium;
a screen creation unit operable to create a menu screen of said reproduction apparatus;
a voice guidance creation unit operable to create voice guidance data indicating that a current input has been switched to an input from said reproduction apparatus or that a current menu screen has been switched to the menu screen of said reproduction apparatus; and
a data output unit operable to output the menu screen created by said screen creation unit to said video display apparatus, and to output the voice guidance data created by said voice guidance creation unit to the video display apparatus, wherein said data output unit is operable to output the voice guidance data created by said voice guidance creation unit to the video display apparatus when a predetermined time has passed since outputting the menu screen of said reproduction apparatus to the video display apparatus; and said video display apparatus including:
- a data input unit operable to receive the menu screen outputted by said data output unit of said reproduction apparatus and the voice guidance data created by said voice guidance creation unit;
- a switching unit operable to switch a current input to an input from said reproduction apparatus; and
- a display unit operable to display a menu screen of said video display apparatus when said switching unit is switched to the current input and display a menu screen of said reproduction apparatus when said switching unit is switched to the input of said reproduction apparatus.

14. The video display system according to claim 13, wherein said video display apparatus further includes:
- a device information obtainment unit operable to obtain device information which is information regarding said reproduction apparatus; and
- a screen creation unit operable to create the menu screen of said video display apparatus using the device information obtained by said device information obtainment unit.

* * * * *